United States Patent
Kim et al.

(10) Patent No.: US 9,760,156 B2
(45) Date of Patent: Sep. 12, 2017

(54) DISPLAY APPARATUS, DISPLAY SYSTEM HAVING PLURAL DISPLAY APPARATUSES, AND METHOD FOR CONTROLLING THE DISPLAY SYSTEM

(71) Applicant: SAMSUNG ELECTRONICS CO., LTD., Suwon-si (KR)

(72) Inventors: Jung Keun Kim, Hwaseong-si (KR); Chang Won Lee, Incheon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/792,947

(22) Filed: Jul. 7, 2015

(65) Prior Publication Data

US 2016/0103476 A1    Apr. 14, 2016

(30) Foreign Application Priority Data

Oct. 13, 2014  (KR) .......................... 10-2014-0137923

(51) Int. Cl.
*G06F 1/32*     (2006.01)
*G06F 3/038*    (2013.01)
(Continued)

(52) U.S. Cl.
CPC .......... *G06F 1/3265* (2013.01); *G06F 1/3218* (2013.01); *G06F 3/038* (2013.01);
(Continued)

(58) Field of Classification Search
CPC ............................. G06F 1/3265; G06F 1/3218
(Continued)

(56) References Cited

U.S. PATENT DOCUMENTS 6,871,252 B1 *  3/2005  Cline .................. G06F 13/4081
                                                             326/30
7,242,370 B2 *  7/2007  Ouchi .................... G09G 5/005
                                                             345/1.3
(Continued)

FOREIGN PATENT DOCUMENTS

| CN | 101577080 A | 11/2009 |
|---|---|---|
| JP | 2008-139772 | * 6/2008 |
| JP | 2008-139772 A | 6/2008 |

OTHER PUBLICATIONS

Communication issued Feb. 8, 2016, issued by the European Patent Office in counterpart European Patent Application No. 15179345.2.

(Continued)

*Primary Examiner* — Chanh Nguyen
*Assistant Examiner* — Daniel Duong
(74) *Attorney, Agent, or Firm* — Sughrue Mion, PLLC

(57) ABSTRACT

A display apparatus, a display system having a plurality of display apparatuses, and a method for controlling the display system are disclosed in which a first voltage of a first transmission channel of a first display apparatus is changed according to transition from a power saving state to a wake-up state and a second display apparatus electrically connected to the first display apparatus detects variation of voltage of a first reception channel corresponding to voltage variation of the first transmission channel and transitions from a power saving state to a wake-up state according to the detection.

17 Claims, 17 Drawing Sheets

(51) Int. Cl.
    *G09G 5/00*     (2006.01)
    *G06F 3/14*     (2006.01)
(52) U.S. Cl.
    CPC ........... *G06F 3/1438* (2013.01); *G09G 5/003* (2013.01); *G09G 2330/022* (2013.01); *G09G 2330/026* (2013.01); *G09G 2330/027* (2013.01); *G09G 2370/04* (2013.01); *G09G 2370/12* (2013.01)
(58) Field of Classification Search
    USPC ........................................................ 345/1.3
    See application file for complete search history.

(56) References Cited

U.S. PATENT DOCUMENTS

| | | |
|---|---|---|
| 2004/0046772 A1 | 3/2004 | Ouchi et al. |
| 2010/0134391 A1 | 6/2010 | Wang |
| 2011/0025695 A1 | 2/2011 | Yoshida et al. |
| 2014/0085484 A1 | 3/2014 | Kambhatla |
| 2014/0173320 A1 | 6/2014 | Tripathi |
| 2015/0134992 A1* | 5/2015 | Zhao ................... G06F 1/3231 713/323 |

OTHER PUBLICATIONS

Communication dated May 10, 2017, issued by the State Intellectual Property Office of P.R. China in counterpart Chinese application No. 201510657160.8.
Communication dated Mar. 22, 2017, issued by the European Patent Office in counterpart European application No. 15179345.2.

* cited by examiner

DISPLAY APPARATUS, DISPLAY SYSTEM HAVING PLURAL DISPLAY APPARATUSES, AND METHOD FOR CONTROLLING THE DISPLAY SYSTEM

CROSS-REFERENCE TO RELATED APPLICATION

This application claims priority from Korean Patent Application No. 10-2014-0137923, filed on Oct. 13, 2014, in the Korean Intellectual Property Office, the disclosure of which is incorporated herein by reference in its entirety.

BACKGROUND

1. Field

Methods and apparatuses consistent with exemplary embodiments relate to a display apparatus, a display system having a plurality of display apparatuses, and a method for controlling the display system.

2. Description of the Related Art

A display apparatus is a device for displaying visual information corresponding to an electrical signal to a user. For example, the display apparatus may include a television, a computer monitor, and various mobile terminals (e.g., a smartphone, a tablet PC, etc.).

For example, the display apparatus may include a cathode ray tube (CRT) display device, a light emitting diode (LED) display device, an organic light emitting diode (OLED) display device, an active-matrix organic light emitting diode (AM OLED) display device, a liquid crystal display (LCD) device, a plasma display panel (PDP) display device, an electronic paper display device, or the like.

A plurality of display apparatuses may be interconnected through a cable or the like. The interconnected display apparatuses may display the same or different images as necessary.

SUMMARY

Therefore, aspects of the exemplary embodiments provide a display apparatus for rapidly waking up each connected display device, a display system including a plurality of display apparatuses, and a method for controlling the display system.

Aspects of the exemplary embodiments provide a display apparatus, a display system having a plurality of display apparatuses, and a method for controlling the display system.

Additional aspects of the exemplary embodiments will be set forth in part in the description which follows and, in part, will be obvious from the description, or may be learned by practice.

In accordance with an aspect of an exemplary embodiment, there is provided a display system including: a first display apparatus including a controller configured to transition the first display apparatus from a power saving state to a wake-up state and a transceiver configured to transition a voltage of a first transmission channel from a first voltage associated with the power saving state to a second voltage associated with the wake-up state, in response to the controller transitioning the first display apparatus from the power saving state to the wake-up state, and a second display apparatus electrically connected to the first display apparatus including a transceiver configured to detect variation of a voltage of a first reception channel corresponding to the transition from the first voltage of the first transmission channel associated with the power saving state to the second voltage associated with the wake-up state and a controller configured to transition the second display apparatus from a power saving state to a wake-up state, in response to the transceiver of the second display apparatus detecting the variation of the voltage of the first reception channel.

The first display apparatus and the second display apparatus may be electrically connected through a display port (DP) cable.

The transceiver of the first display apparatus may include: a first voltage receiver configured to receive voltage when the first display apparatus transitions to a wake-up state, the first voltage receiver connected to the first transmission channel.

The first voltage receiver may include a pull-up resistor.

The transceiver of the second display apparatus may include: a detector pin configured to detect the variation of the voltage of the first reception channel.

The second display apparatus may include: a second voltage receiver configured to receive voltage when the second display apparatus transitions to a wake-up state; and a second transmission channel connected to the second voltage receiver, wherein a voltage of the second transmission channel is transitioned from the first voltage associated with the power saving state to the second voltage associated with the wake-up state, in response to the controller of the second display apparatus transitioning the first display apparatus from the power saving state to the wake-up state based on voltage applied to the second voltage receiver.

The display system may further include: a third display apparatus electrically connected to the first display apparatus or the second display apparatus, the first display apparatus including a transceiver configured to detect variation of a voltage of a second reception channel corresponding to the transition from the first voltage of the first transmission channel to the second voltage of the first transmission channel or corresponding to transition of voltage of the second transmission channel from the first voltage to the second voltage, and a controller configured to transition the third display apparatus from the power saving state to the wake-up state, in response to the transceiver of the third display apparatus detecting the variation of the voltage.

Each of the first transmission channel and the first reception channel may include an AUX minus channel (AUX− channel).

The first reception channel may be connected to a pull-down resistor.

The controller of the first display apparatus may drive the first display apparatus during the wake-up state, and the controller of the second display apparatus may transition to a wake-up state independently from the driving of the first display apparatus.

In accordance with another aspect of an exemplary embodiment, there is provided a method for controlling a display system including a plurality of interconnected display apparatuses includes: transitioning a first display apparatus among the plurality of apparatuses from a power saving state to a wake-up state; changing a first voltage of a first transmission channel of the first display apparatus from a first voltage associated with the power saving state to a second voltage associated with the wake-up state, based on the transitioning; detecting variation of a second voltage of a voltage of a reception channel of a second display apparatus among the plurality of apparatuses corresponding to the transition from the first voltage of the first transmission channel associated with the power saving state to the second voltage associated with the wake-up state; and transitioning the second display apparatus from the power saving state to the wake-up state, in response to the detecting.

The first display apparatus and the second display apparatus may be electrically connected through at least one display port (DP) cable.

The changing of the first voltage of the first transmission channel of the first display apparatus may include: applying a voltage to a first voltage receiver connected to the first transmission channel, and changing the first voltage of the first transmission channel to the second voltage of the first transmission channel.

The voltage receiver may include a pull-up resistor.

The detecting of the second voltage variation of the second reception channel may be performed by a detector pin.

The method may further include: applying a voltage to a second voltage receiver connected to a second transmission channel, when the second display apparatus transitions to the wake-up state; and changing a voltage of the second transmission channel according to a voltage applied to the second voltage receiver.

The method may further include: changing a voltage of a second reception channel of a third display apparatus according to variation of voltage of the first transmission channel of the first display apparatus or according to variation of voltage of the second transmission channel of the second display apparatus; detecting variation of voltage of a second reception channel of the third display apparatus; and transitioning the third display apparatus from a power saving state to a wake-up state in response to the detecting.

Each of the first transmission channel and the first reception channel may include an AUX minus channel (AUX− channel).

The first reception channel may be connected to a pull-down resistor.

The method may further include: performing system driving of the first display apparatus during the wake-up state, wherein the transitioning the second display apparatus from the power saving state to the wake-up state is performed independently from the system driving of the first display apparatus.

In accordance with another aspect of an exemplary embodiment, there is provided a display apparatus including: a first reception channel electrically connected to a first transmission channel of an external display apparatus, the first reception channel configured to perform variation of voltage of the first reception channel in response to variation of a voltage of the first transmission channel; a sensing unit configured to detect the variation of the voltage of the first reception channel; and a power-supply management unit configured to output a wake-up signal in response to the sensing unit detecting the variation of the voltage of the first reception channel.

The display apparatus may further include: a voltage receiver configured to receive a voltage based on the wake-up signal; and a second transmission channel configured to change a voltage of the second transmission channel in response to the voltage receiver receiving the voltage.

In accordance with another aspect of an exemplary embodiment, there is provided a display system including: a first display apparatus configured to output an electric signal in response to a voltage applied to one or more components when the first display apparatus transitions from a power saving state to a wake-up state; and a second display apparatus configured to detect the electric signal and transition from a power saving state to a wake-up state in response to detecting the electric signal, wherein the second display apparatus transitions to the wake-up state independently from system driving of the first display apparatus.

BRIEF DESCRIPTION OF THE DRAWINGS

The above and/or other aspects will become apparent and more readily appreciated from the following description of the exemplary embodiments, taken in conjunction with the accompanying drawings of which.

DETAILED DESCRIPTION

Figure 1:
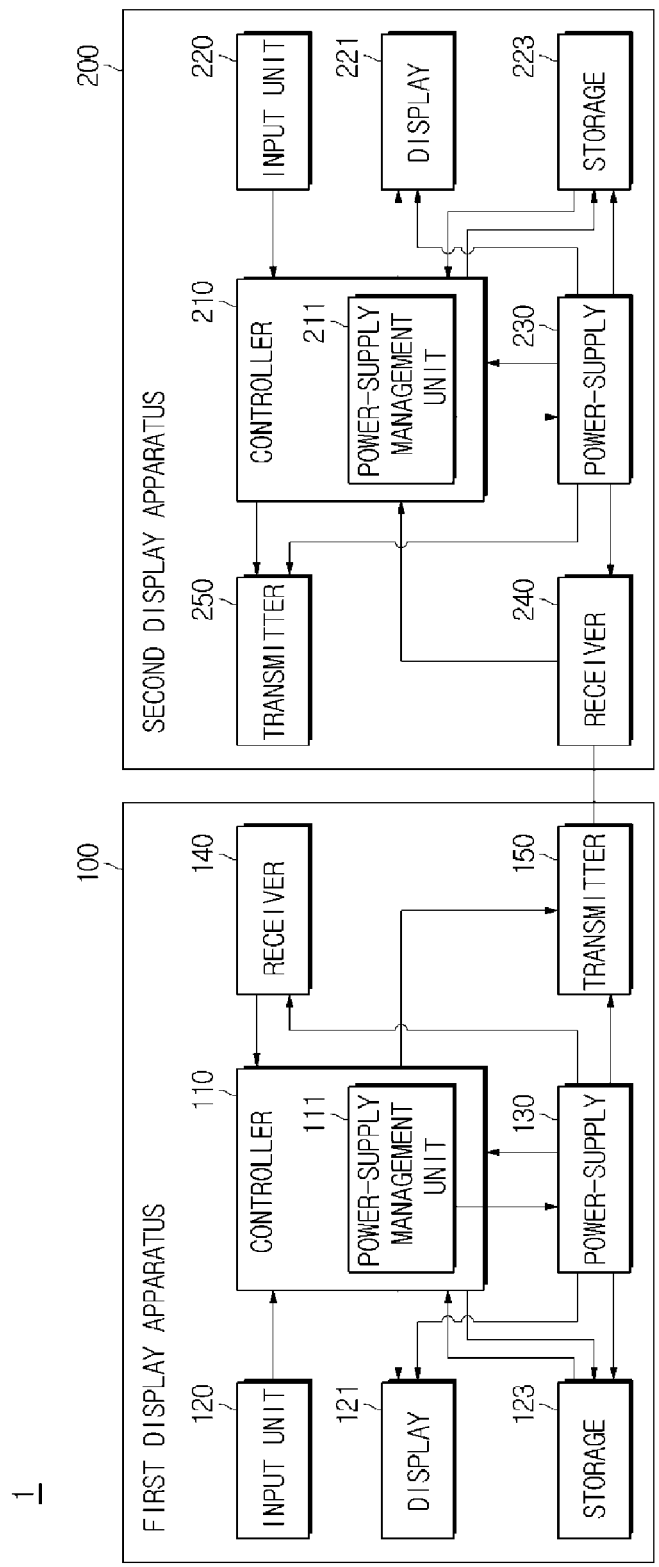
FIG. 1 is a block diagram illustrating a display system according to an exemplary embodiment.

Reference will now be made in detail to the exemplary embodiments, examples of which are illustrated in the accompanying drawings, wherein like reference numerals refer to like elements throughout. A display apparatus and a display system including a plurality of display apparatuses according to an exemplary embodiment will hereinafter be described with reference to FIGS. 1 to 11.

Figure 2:
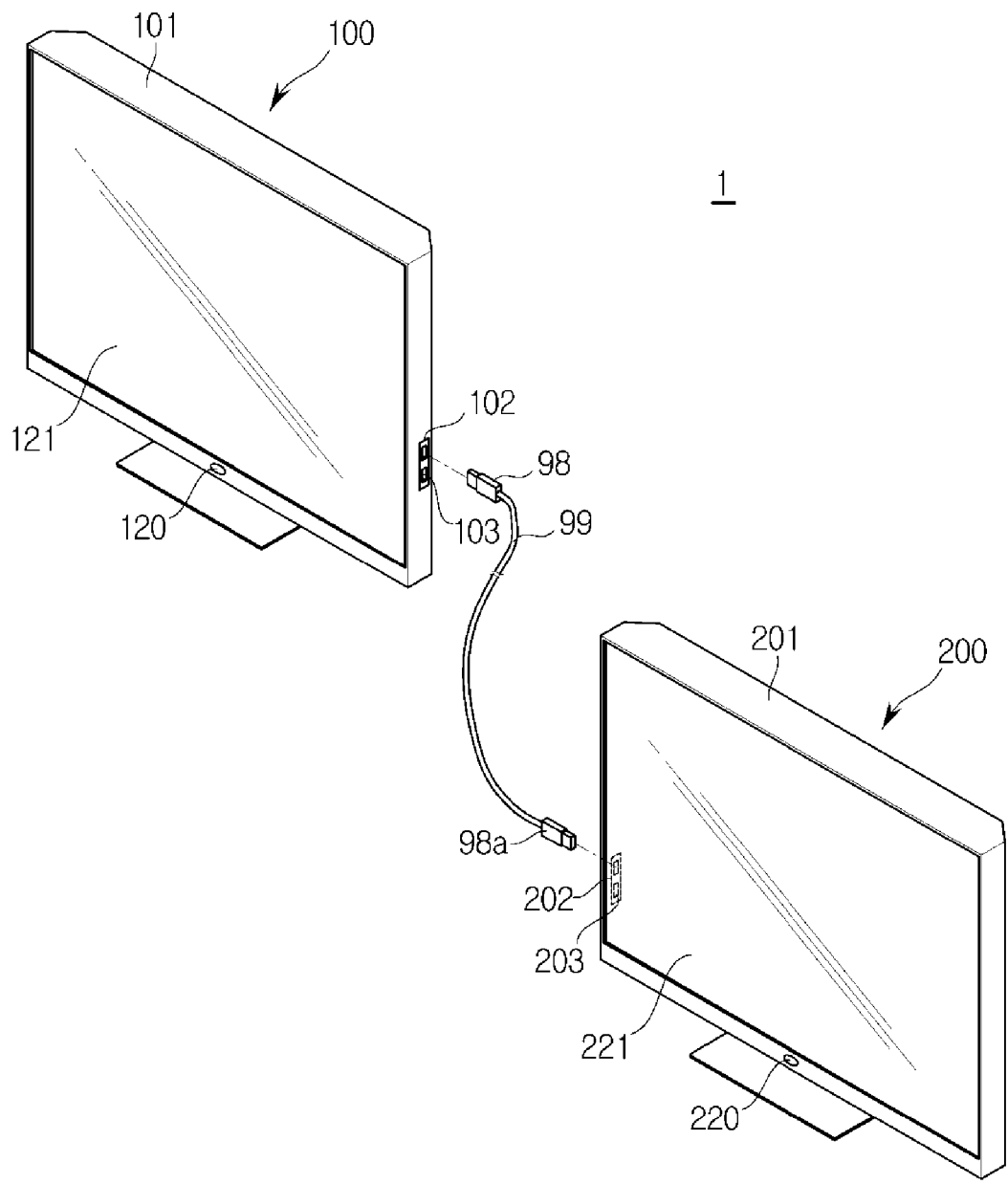
FIG. 2 is a view illustrating a display system according to an exemplary embodiment.

FIG. 1 is a block diagram illustrating a display system according to an exemplary embodiment. FIG. 2 is a view illustrating a display system according to an exemplary embodiment.

Referring to FIGS. 1 and 2, a display system 1 may include two display apparatuses (100, 200) electrically and/or communicatively connected to each other. One of the two display apparatuses (100, 200) is referred to as a first display apparatus 100, and the other display apparatus is referred to as a second display apparatus 200.

The first display apparatus 100 and the second display apparatus 200 may be the same make and model, the same kind or different kinds of display apparatuses. The first display apparatus 100 or the second display apparatus 200 may be a display apparatus used for various purposes at home or industry. For example, the first display apparatus 100 and the second display apparatus 200 may be used at home or in schools or the like, or may be implemented by display devices used in industry (such as a factory) or in hospitals or medical institutions. In addition, the first display apparatus 100 and the second display apparatus 200 may be implemented by various kinds of display devices used in various technical fields. The first display apparatus 100 and the second display apparatus 200 may be used for various purposes or usages. For example, the first display apparatus 100 and the second display apparatus 200 may allow a user to view a broadcast program, may reproduce images, such as games or movie images, may be used for traffic control and traffic monitoring, may be used for disaster prevention, and may display advertisement images. For example, the first display apparatus 100 and the second display apparatus 200 may include a television, a computer monitor, etc.

The first display apparatus 100 and the second display apparatus 200 may output and display still images or moving images on the basis of stored data or data received from another source. The first display apparatus 100 and the second display apparatus 200 may output and display the same still images or the same moving images, or may also output and display different still images or different moving images.

If the first display apparatus 100 and the second display apparatus 200 output different still images or different moving images, the still image displayed on the first display apparatus 100 may be any one of two still images acquired by dividing one image into two images, and the still image displayed on the second display apparatus 200 may be the other one of two still images. Even when the first display apparatus 100 and the second display apparatus 200 output and display different moving images, especially, even when the first and second display apparatuses (100, 200) sequentially display the moving image frames, the moving image frame displayed on the first display apparatus 100 may be any one of two moving image frames acquired by dividing one moving image frame into two moving image frames, and the moving image frame displayed on the second display apparatus 200 may be the other one of two moving image frames.

Referring to FIG. 1, the first display apparatus 100 may include a controller 110, an input unit 120, a display 121, a storage 123, a power-supply 130, a receiver 140, and a transmitter 150.

The controller 110 may generate a control signal, transmit the generated control signal to respective components of the first display apparatus 100, and thus control overall operations of the first display apparatus 100. For example, upon receiving signals from the input unit 120 or the receiver 140, the controller 110 may control the display 121 to display an image or may store an image in the storage 123. In this case, the image may include still images and moving images. The controller 110 may transmit control signals or images to the second display apparatus 200 through the transmitter 150.

The controller 110 may be implemented as a microprocessor or micro controller unit (MCU) configured to perform various functions, for example, arithmetic logical operation, recording, command decoding, and control signal generation. The microprocessor or the MCU may be implemented by one or more semiconductor chips mounted to a printed circuit board (PCB). The controller 110 may further include a graphics chip (e.g., graphics processing unit GPU) for controlling images displayed on the display 121. If necessary, the microprocessor or the MCU may be electrically connected to a separate memory device, and the separate memory device may include various kinds of data needed for driving the microprocessor or the MCU. The separate memory device may include a read only memory (ROM) or a random access memory (RAM).

The controller 110 may drive system software needed to control overall operations of the first display apparatus 100. The system software may be stored in the storage 123. The system software may be temporarily stored in ROM or RAM in response to a start command of the first display apparatus 100, or may be driven by the controller 110. Various components of the first display apparatus 100 may be requested according to the driving of the system software.

Referring to FIG. 1, the controller 110 may further include a power-supply management unit 111. The power-supply management unit 111 may be implemented by one or more semiconductor chips mounted to the PCB, or may also be implemented by various methods well known to those skilled in the art.

The power-supply management unit 111 may generate a control signal in response to predefined setting or user manipulation, and may control the power-supply 130 or various components (120 to 150) according to a control signal, so that the power-supply management unit 111 can manage power consumption of the first display apparatus 100. Here, the predefined setting may include a predetermined time at which the operation state of the first display apparatus 100 is changed or an elapse time generated after a predetermined operation state is maintained.

In accordance with an exemplary embodiment, the first display apparatus 100 may maintain a predetermined operation state according to a specific situation, or may transition to a different operation state. Here, the operation state may include at least one of a power-off state, a power saving state, and a wake-up state. The power-off state may indicate that all or most constituent components needed for the first display apparatus 100 are powered off so that the first display apparatus 100 is not operated. The power saving state may indicate that only some constituent components from among all constituent components receiving power of the first display apparatus 100 are powered on, and the remaining constituent components are powered off, so that the first display apparatus 100 consumes a smaller amount of power than the wake-up state. In this case, some constituent components to be powered on may include constituent components (e.g., the power-supply management unit 111) needed for power management. Some components configured to receive power may be selected or decided by a system designer. During the power-off state or the power saving state, the system software may not be driven by the controller 110. During the wake-up state, all or most constituent components receiving power of the first display apparatus 100 are powered on, and the first display apparatus 100 performs a general operation.

The power-supply management unit 111 of the controller 110 may control a plurality of constituent components to be powered on, so that the power-supply management unit 111 may transition the first display apparatus 10 from the power saving state to the wake-up state or from the wake-up state to the power saving state.

In accordance with an exemplary embodiment, the power-supply management unit 111 may transition the first display apparatus 100 from the power saving state to the wake-up state or from the wake-up state to the power saving state using VESA DPMS (Display Power Management Signaling). VESA DPMS may indicate a standard for managing power supply of a display device such as a video monitor. In accordance with VESA DPMS, the display apparatus may have any one of an ON state, a standby state, a suspend state, and an OFF state. Different power usage degrees and different return times may be allocated to the respective states.

The input unit 120 may receive various commands related to the first display apparatus 100 from a user, generate a predetermined signal according to a user input, and transmit the predetermined signal to the controller 110. The input unit 120 may be a user interface implemented by various physical buttons mounted to an exterior housing 101, a trackball, a jog-shuttle, a touch button, a touchscreen, or various sensors. The input unit 120 may include a power button. If the power button of the input unit 120 is touched or manipulated, the power-supply management unit 111 of the controller 110 may power on each component of the first display apparatus 100, so that the first display apparatus 100 can transition to the wake-up state.

The display 121 may convert an electric signal into a visual signal, and thus display images such as still images or moving images. The display 121 may be implemented by a cathode ray tube (CRT), a light emitting diode (LED), an organic light emitting diode (OLED), an active-matrix organic light emitting diode (AM OLED), a liquid crystal display (LCD), a plasma display panel (PDP), an electronic paper display device, or the like. In accordance with the embodiment, the display 121 may be a touchscreen. Here, the display 121 may serve as an input unit 120.

The storage 123 may store images to be reproduced in the first display apparatus 100 or may store various data or software needed for driving the first display apparatus 100. The storage 123 may also store the system software. Here, various data may include setting information related to driving of the first display apparatus 100. For example, the setting information may include information regarding a time needed for allowing the first display apparatus 100 to transition from the wake-up state to the power saving state.

The power-supply 130 may provide power to various components needed for operating the first display apparatus 100. For example, the power-supply 130 may provide power to a microprocessor implementing the controller 110 or a physical interface of the transmitter 150. In accordance with an exemplary embodiment, the power-supply 130 may receive a commercial power source from an external part, increase or reduce the received commercial power, and thus transmit the increased or reduced power source to individual components. In accordance with an exemplary embodiment, the power-supply 130 may include a storage battery. The power-supply 130 may provide power to a specific component according to a control signal of the power-supply management unit 111, or may not provide the power source to other components.

Referring to FIG. 1, the first display apparatus 100 may include a receiver 140 and a transmitter 150, which are capable of being electrically connected to an external device (for example, the second display apparatus 200). The first display apparatus 100 may receive or transmit electric signals from the receiver 140 or to the transmitter 150. The receiver 140 and transmitter 150 may be embodied as a transceiver.

The receiver 140 and the transmitter 150 may include exposed terminals (102, 103) of the exterior housing 101 of the first display apparatus 100, and various circuits and communication chips connected to the terminal 103. Some of the circuits and communication chips may be omitted for convenience of description according to embodiments.

Connectors 98 provided at the end of a cable 99 may be coupled to the terminals 102, 103. If the terminals 102, 103 of the first display apparatus 100 are coupled to one connector 98 and the terminals 202, 203 exposed to the exterior housing 201 of the second display apparatus 200 are also coupled to the other connector 98a, the first display apparatus 100 and the second display apparatus 200 may be electrically interconnected through the cable 99. If the first display apparatus 100 and the second display apparatus 200 are interconnected, the first display apparatus 100 may transmit data to the second display apparatus 200 as necessary, or the first display apparatus 100 may receive data from the second display apparatus 200.

The cable 99 may electrically connect the first display apparatus 100 to the second display apparatus 200. The cable 99 may be used as a data communication passage between the first display apparatus 100 and the second display apparatus 200. The cable 99 may include a cable for display port, a cable for HDMI (High Definition Multimedia Interface), a cable for DVI (Digital Visual Interactive), or a cable for UDI (Unified Display Interface). In addition, a conversion cable having different kinds of connectors may be located at the end of the cable 99.

Figure 3:
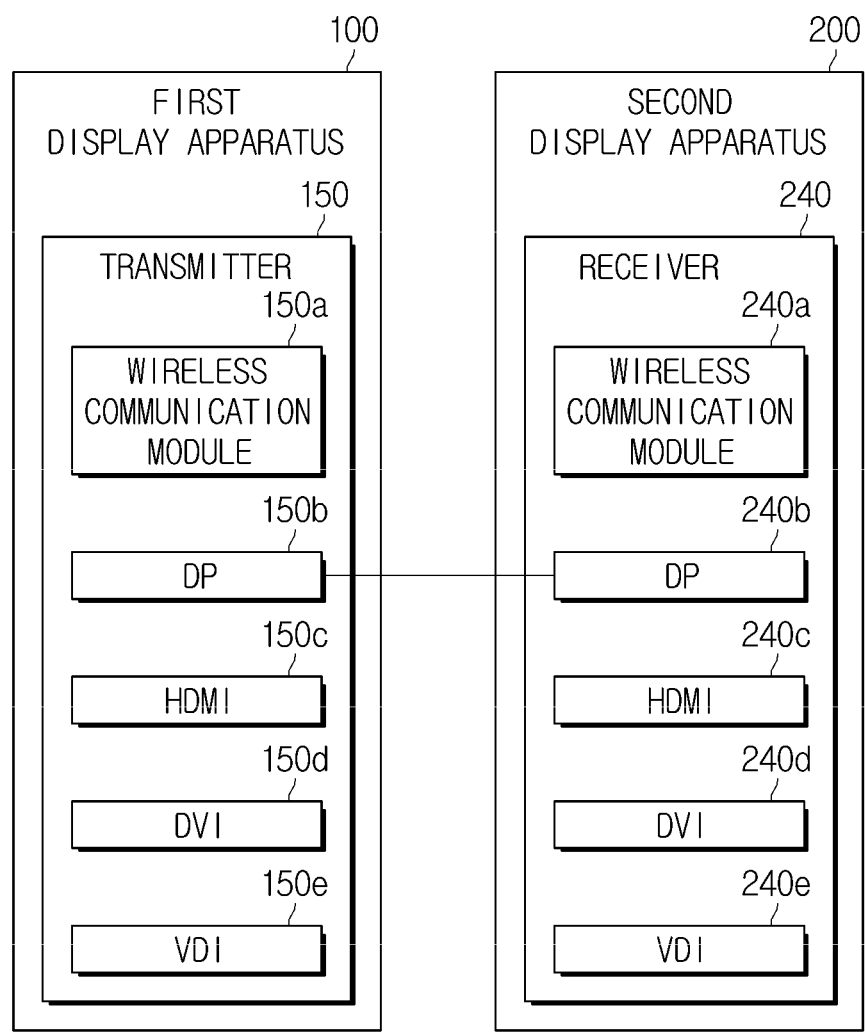
FIG. 3 is a block diagram illustrating a transmitter and a receiver for use in a display apparatus according to an exemplary embodiment.

FIG. 3 is a block diagram illustrating a transmitter and a receiver for use in a display apparatus according to an exemplary embodiment.

Referring to FIG. 3, the transmitter 150 of the first display apparatus may include a physical interface through which various interface technologies are performed. According to interface technology, the first display apparatus 100 may exchange data with an external device according to a predetermined communication protocol. The physical interface may include the above-mentioned terminals 102, 103 and a circuit.

Referring to FIG. 3, the physical interface may include various physical interfaces corresponding to various kinds of interference technologies, for example, a wireless communication module 150a, a display port (DP) 150a, a high definition multimedia interface (HDMI) 150b, a digital visual interactive (DVI) 150c, and a unified display interface (UDI) 150d. In this case, the wireless communication module 150a may indicate a communication module capable of performing one or more mobile communication technologies or near field communication technology. The wireless communication module may include one or more communication chips and one or more antennas. The first display apparatus 100 may include any one or two of various physical interfaces according to selection of the system designer.

Physical interfaces 150a-150e of the transmitter 150 of the first display apparatus 100 may be electrically connected to the corresponding physical interfaces 240a-240e of the receiver 240 of the second display apparatus 200, respectively. As described above, the respective physical interfaces 150a-150e may be electrically connected to the physical interfaces 240a-240e using the cable 99 appropriate for each physical interface, respectively. For example, the interface 150a based on a display port of the transmitter 150 may be connected to the interface 240b based on a display port of the receiver 150 using the display port cable including a connector capable of being connected to the display port terminal. Of course, the respective physical interfaces 150a-150e of the transmitter 150 of the first display apparatus 100 may be connected to different physical interfaces 240a-240e of the receiver 240 through a conversion cable or the like. For example, a connector capable of being connected to a display port terminal may be provided at one end of the interface 150a based on a display port of the transmitter 150. At the other end of the interface 150a, the interface 150a may also be connected to the HDMI-based interface 240*c* of the receiver 150 using a cable including a connector capable of being connected to the HDMI terminal.

Although not shown in FIG. 3, the receiver 140 of the first display apparatus 100 may include one or more physical interfaces needed for implementing various interface technologies in the same manner as the transmitter 150.

At least one of the controller 110, the input unit 120, the display 121, the storage 123, the power-supply 130, the receiver 140, and the transmitter 150 of the first display apparatus 100 will herein be omitted according to an exemplary embodiment.

Referring to FIG. 1, the second display apparatus 200 may include a controller 210, an input unit 220, a display 21, a storage 222, a power-supply 230, a receiver 240, and a transmitter 250. The controller 210 may include a power-supply management unit 211. The controller 210, the input unit 220, the display 221, the storage 222, the power-supply 230, the receiver 240 and the transmitter 250 of the second display apparatus 200 are substantially identical in function to the controller 110, the input unit 120, the display 121, the storage 123, the power-supply 130, the receiver 140 and the transmitter 150 of the first display apparatus 100, and as such redundant detailed description thereof will herein be omitted for convenience of description. If necessary, the controller 210, the input unit 220, the display 221, the storage 222, the power-supply 230, the receiver 240 and the transmitter 250 of the second display apparatus 200 may be different from those of the first display apparatus 100 in terms of function. In addition, although the controller 210, the input unit 220, the display 221, the storage 222, the power-supply 230, the receiver 240, and the transmitter 250 of the second display apparatus 200 may be identical in function to those of the first display apparatus 100, categories thereof may be implemented using other constituent components.

In accordance with an exemplary embodiment, at least one of the controller 210, the input unit 220, the display 221, the storage 222, the power-supply 230, the receiver 240 and the transmitter 250 of the second display apparatus 200 may be omitted as necessary.

For convenience of description, the display apparatuses 100, 200 and the display system 1 will hereinafter be described according to the embodiment in which the display apparatuses 100, 200 use the display port as the interface technology. However, the display apparatus and the display system including a plurality of display apparatuses are not limited to the embodiment in which a display port to be described later is used as the interface technology. The following embodiments may be equally applied to the display apparatus and display system based on other interface technologies, or may be modified to be readily appreciated by those skilled in the art without departing from the scope or spirit of the present invention.

The transmitter 150 of the display port of the first display apparatus 100 will hereinafter be described with reference to FIGS. 4 and 5. The receiver 240 of the display port of the second display apparatus 100 will hereinafter be described with reference to FIGS. 6 and 7. A method for changing a second voltage in the receiver 240 according to connection of the transmitter and the receiver will hereinafter be described in detail.

The transmitter configured to use the display port of the first display port 100 will hereinafter be referred to as a first transmitter 150, and the receiver configured to use the display port of the second display apparatus 100 will hereinafter be referred to as a first receiver 240. In addition, a voltage of a transmission channel 151 of the first transmitter 150 is referred to as a first voltage, and a voltage of a reception channel 242 of the first receiver 240 is referred to as a second voltage. Here, ordinal numbers attached to the front parts of the terms "transmitter", "receiver" and "voltage" may be used to discriminate between different transmitters, different receivers, or different voltages, are not limited to a specific order.

Figure 4:
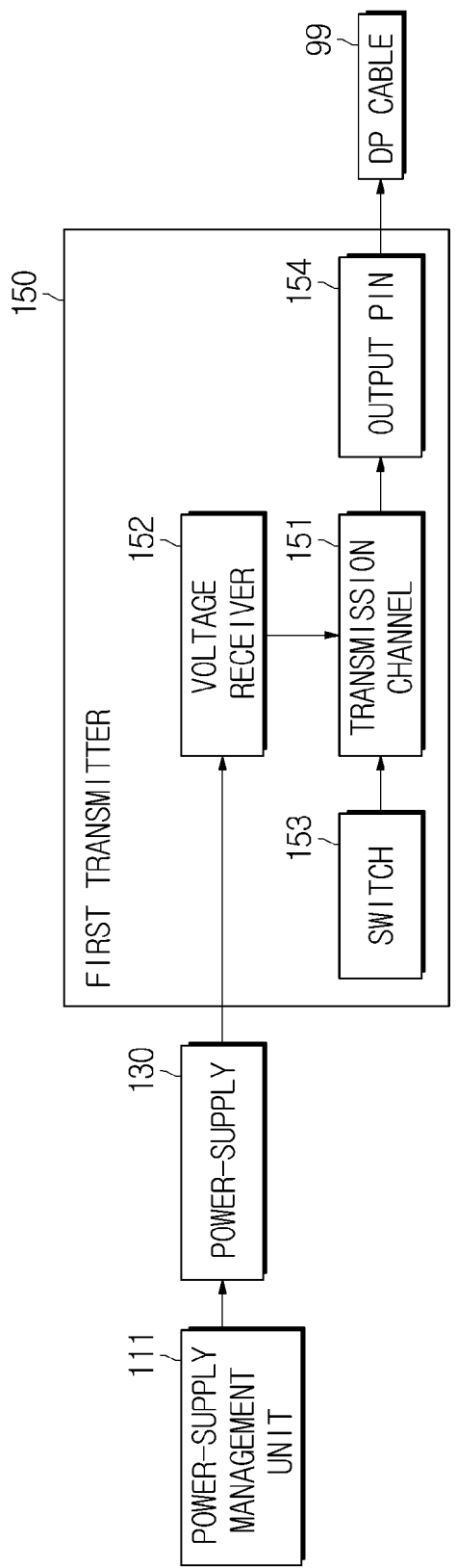
FIG. 4 is a block diagram illustrating a transmitter of a display port according to an exemplary embodiment.

FIG. 4 is a block diagram illustrating a transmitter of a display port according to an exemplary embodiment. FIG. 5 is a circuit diagram illustrating a transmitter of a display port according to an exemplary embodiment.

Figure 5:
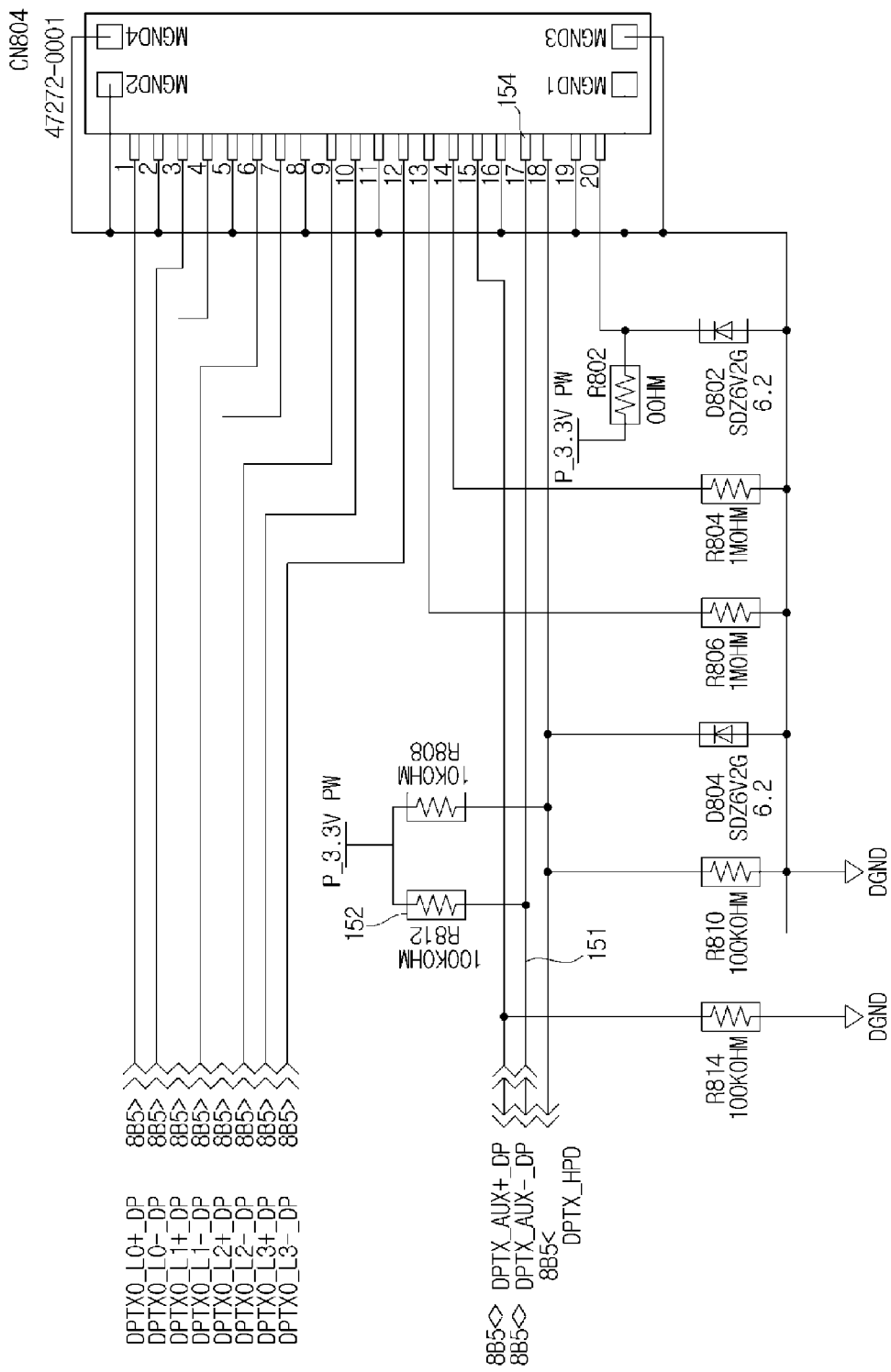
FIG. 5 is a circuit diagram illustrating a transmitter of a display port according to an exemplary embodiment.

Referring to FIGS. 4 and 5, the first transmitter 150 may include a transmission channel 151, a voltage receiver 152, a switch 153, and an output pin 154.

The transmission (Tx) channel 151 of the first transmitter 150 may be the medium through which data is transferred to the second display apparatus 200. The transmission (Tx) channel 151 may be an AUX minus channel (i.e., AUX– channel) according to an exemplary embodiment, and the voltage receiver 152 may be connected to the Tx channel 151.

The voltage receiver 152 may be connected to the Tx channel 151 through a predetermined circuit. The voltage receiver 152 may receive a predetermined voltage when the first display apparatus 100 transitions from the power saving state to the wake-up state. In accordance with the exemplary embodiment, a predetermined voltage applied to the voltage receiver 152 may include a voltage of 3.3 V. If necessary, the predetermined voltage applied to the voltage receiver 152 is not limited only to 3.3V, and other voltages may also be applied to the voltage receiver 152. The voltage receiver 152 may receive a predetermined voltage by power supplied from the power-supply 130 under control of the power-supply management unit 111. The voltage receiver 152 may be implemented by a pull-up resistor as shown in FIG. 5. The pull-up resistor may prevent a voltage applied to a channel or a circuit from being floated, and may allow a recognizable predetermined voltage to be maintained. The pull-up resistor may generate a low or high voltage in the Tx channel 151 according to the on/off operation of the switch. In accordance with the exemplary embodiment, the pull-up resistor may be implemented using a 100 kΩ resistor.

If the first display apparatus 100 transitions from the power saving state to the wake-up state and a voltage of 3.3V is applied to the voltage receiver 152, the Tx channel 151 receives the high voltage as an input. In other words, a first voltage of the Tx channel 151 may be changed.

The switch 153 may connect a predetermined circuit contained in the first display apparatus 100 to the Tx channel 151 or may prevent the predetermined circuit from being connected to the Tx channel 151, so that the electric signal received from the circuit may or may not be output to the external part through the Tx channel 151.

The output pin 154 may connect the Tx channel 151 to the cable 99, for example, the display port cable. The output pin 154 may transmit the electric signal output through the Tx channel 151 to the cable 99 as necessary.

Figure 6:
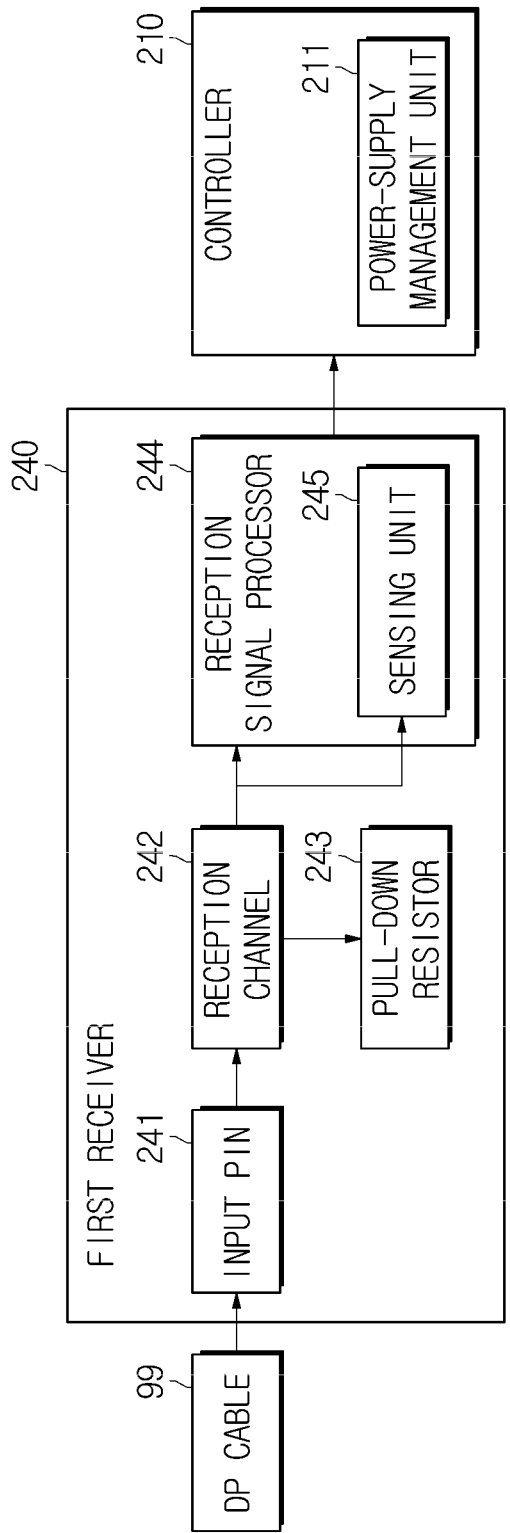
FIG. 6 is a block diagram illustrating a receiver of a display port according to an exemplary embodiment.
Figure 7:
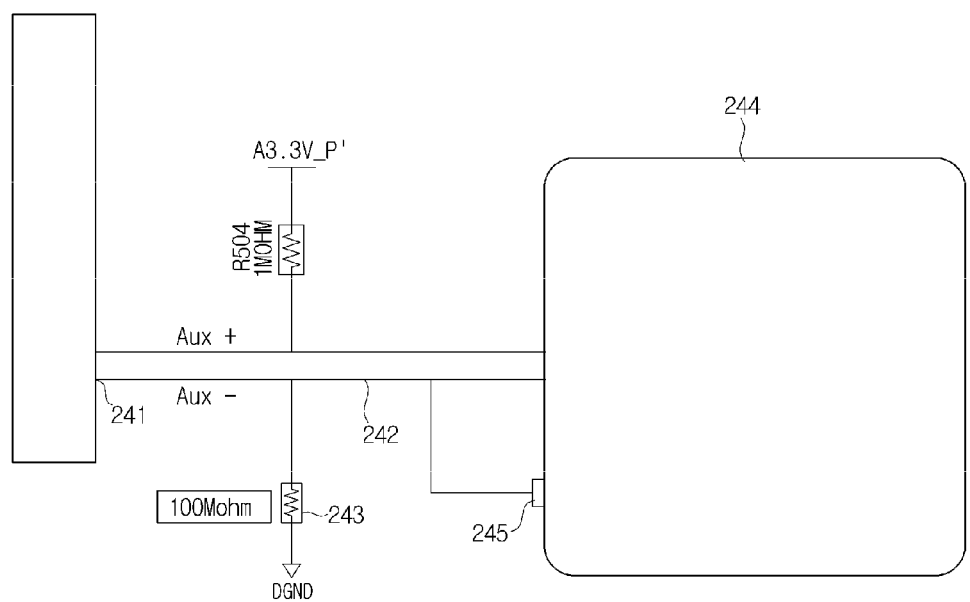
FIG. 7 is a circuit diagram illustrating a receiver of a display port according to an exemplary embodiment.

FIG. 6 is a block diagram illustrating a receiver of a display port according to an exemplary embodiment. FIG. 7 is a circuit diagram illustrating a receiver of a display port according to an exemplary embodiment.

Referring to FIGS. 6 and 7, the first receiver 240 may include an input pin 241, a reception (Rx) channel 242, a pull-down resistor 243, a reception (Rx) signal processor 244, and a sensing unit 245.

The input pin 241 may connect the cable 99, for example, the display port cable, to the Rx channel 242. The input unit 241 may transmit an electric signal received through the cable 99 to the Rx channel 242.

The Rx channel 242 may be a medium through which received data is transferred to the Rx signal processor 244. The Rx channel 242 may be provided to correspond to the Tx channel 151. For example, if the Rx channel 151 is implemented as the AUX–channel, the Rx channel 242 may also be the AUX–channel. The pull-down resistor 243 may be connected to the Tx channel 151.

The pull-down resistor 243 may be connected to the Rx channel 242. The pull-down resistor 243 may generate a low or high voltage in the Rx channel 242 according to the on/off operation of the switch. In accordance with the exemplary embodiment, the pull-down resistor may be implemented using a 100 kΩ resistor.

The Rx signal processor 244 may be connected to the Rx channel 242, may receive an electric signal through the Rx channel 242, and may amplify or scale the electric signal. The Rx signal processor 244 may be implemented by one or more semiconductor chips or integrated circuits (ICs). The Rx signal processor 244 may include a scaler.

The sensing unit 245 may sense variation of the second voltage of the Rx channel 242. The sensing unit 245 may output a predetermined signal according to the sensing result, and transmit the predetermined signal to the power-supply management unit 211 of the second display apparatus 200. The sensing unit 245 may be connected to the Rx channel 242. For example, the sensing unit 245 may be connected through a circuit branched from the Rx channel 242 as shown in FIG. 7.

The sensing unit 245 may be a detector pin according to one exemplary embodiment, and the detector pin may be driven even when the second display apparatus 200 is in the power saving state. The detector pin of the sensing unit 245 may be mounted to the semiconductor chip or IC implementing the Rx signal processor 244. The detector pin may also be mounted to the scaler.

The power-supply management unit 211 may control the supply of power to individual components of the second display apparatus 200 according to the sensing result of the sensing unit 245. If the sensing unit 245 detects variation of the second voltage of the Rx channel 242, the power-supply management unit 211 outputs a wake-up signal for supplying power to individual components of the second display apparatus 200 on the basis of the detected voltage variation, so that the second display apparatus 200 can transition from the power saving state to the wake-up state.

Figure 8:
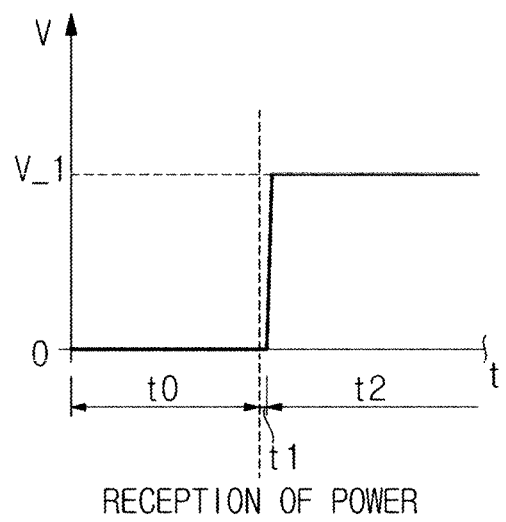
FIG. 8 is a graph illustrating voltage variation of a receiver of a display port according to an exemplary embodiment.

FIG. 8 is a graph illustrating voltage variation of a receiver of a display port according to an exemplary embodiment.

As described above, the Tx channel 151 of the first transmitter 150 may be connected to the voltage receiver 152 implemented as a pull-up resistor. If the first display apparatus 100 transitions from the power saving state to the wake-up state and a predetermined voltage is applied to the pull-up resistor, the Tx channel 151 may have a high voltage according to the received voltage. Meanwhile, the Tx channel 151 of the first transmitter 150 may be electrically connected to the Rx channel 242 of the first receiver 240 and the pull-down resistor 243 is connected to the first receiver 240, so that there may occur a voltage variation in the Rx channel 242 according to change of a voltage of the Tx channel 151 as shown in FIG. 8. The voltage variation of the Rx channel 242 may be generated by a pull-up resistor connected to the Tx channel 151 and a pull-down resistor connected to the Rx channel 242.

Referring to FIG. 8, if the first display apparatus 100 is in the power saving state at a time point (t0), there is no change in voltage of the Tx channel 151 so that the voltage of the Rx channel 242 may not be changed. In this case, a voltage of the Rx channel 242 may be set to zero (0V). If the first display apparatus 100 transitions from the power saving state to the wake-up state, the Tx channel 151 may have a high voltage. As a result, the pull-up resistor is connected to the Tx channel 151 and the pull-down resistor is connected to the Rx channel 242, so that a predetermined voltage (V_1) may occur in the Rx channel 242 at a time point (t2). A voltage generated in the Rx channel 242 may be set to a specific voltage (for example, 1.2 V), and may be changed according to resistance values of a pull-up resistor or a pull-down resistor. After lapse of a predetermined time (t1), a predetermined voltage (V_1) may also occur in the Rx channel 242 according to a physical distance between the Tx channel 151 and the Rx channel 242 or the properties of the cable 99.

Meanwhile, as shown in FIG. 8, if a predetermined voltage (V_1) occurs in the Rx channel 242, no current may flow in the Rx channel 242. In other words, a first voltage of the Tx channel 151 and a second voltage of the Rx channel 242 may be changed even when an electric signal does not pass through the Tx channel 151, the cable 99 or the Rx channel 242, because the above change of the second voltage may be generated by a difference in characteristics and size between the pull-up resistor connected to the Tx channel 151 and the pull-down resistor connected to the Rx channel 242.

As described above, the sensing unit 245 may sense the above change of the second voltage and may output the sensing result. For example, if the second voltage is changed in a manner that is the same as the manner in which the second voltage transitions from a low voltage to a high voltage, the second display apparatus 200 may transition from the power saving state to the wake-up state. Therefore, after the predetermined voltage (V_1) has occurred at a time point (t2), the second display apparatus 200 may transition to the wake-up state within a predetermined time.

As described above, because the second display apparatus 200 awakes according to variation of the second voltage of the Rx channel 242, the second display apparatus 200 need not receive an additional wake-up command from the first display apparatus 100. In this case, the wake-up command is a command generated from the first display apparatus 100 so that the second display apparatus 200 is switched to the wake-up state. The second display apparatus 200 may be switched to the wake-up state without receiving the wake-up command from the first display apparatus 100. The wake-up command can be generated after completion of system driving of the first display apparatus 200, so that the second display apparatus 200 can transition to the wake-up state irrespective of completion of the system driving of the first display apparatus 100. In other words, the second display apparatus 200 may independently transition to the wake-up state from system driving of the first display apparatus 100.

In other words, according to a display system 1 in which the first display apparatus 100 and the second display apparatus 200 are interconnected and sequentially transition to the wake-up state, if the first display apparatus 100 and the second display apparatus 200 awake, the second display apparatus 200 need not be in the standby mode until the system program of the first display apparatus 100 is completely driven, so that the second display apparatus 200 can quickly transition to the wake-up state. Therefore, the first display apparatus 100 and the second display apparatus 200 can transition to the wake-up state more quickly than the case in which the first display apparatus 100 transmits a separate wake-up command to the second display apparatus 200.

In accordance with the exemplary embodiment, the display system 1 may further include a third display apparatus, and a third display apparatus may be electrically connected to the first display apparatus 100 or the second display apparatus 200. The third display apparatus may detect variation of a fourth voltage of the Rx channel of the receiver of the third display apparatus according to variation of a first voltage of the Tx channel 151 of the first display apparatus 100 or according to variation of a third voltage of the Tx channel of the second display apparatus 200. As a result, the third display apparatus can transition from the power saving state to the wake-up state according to the sensing result.

An example of a multi-display system will hereinafter be described as another embodiment of the display system. The multi-display system may also be referred to as a multi-vision as necessary.

Figure 9:
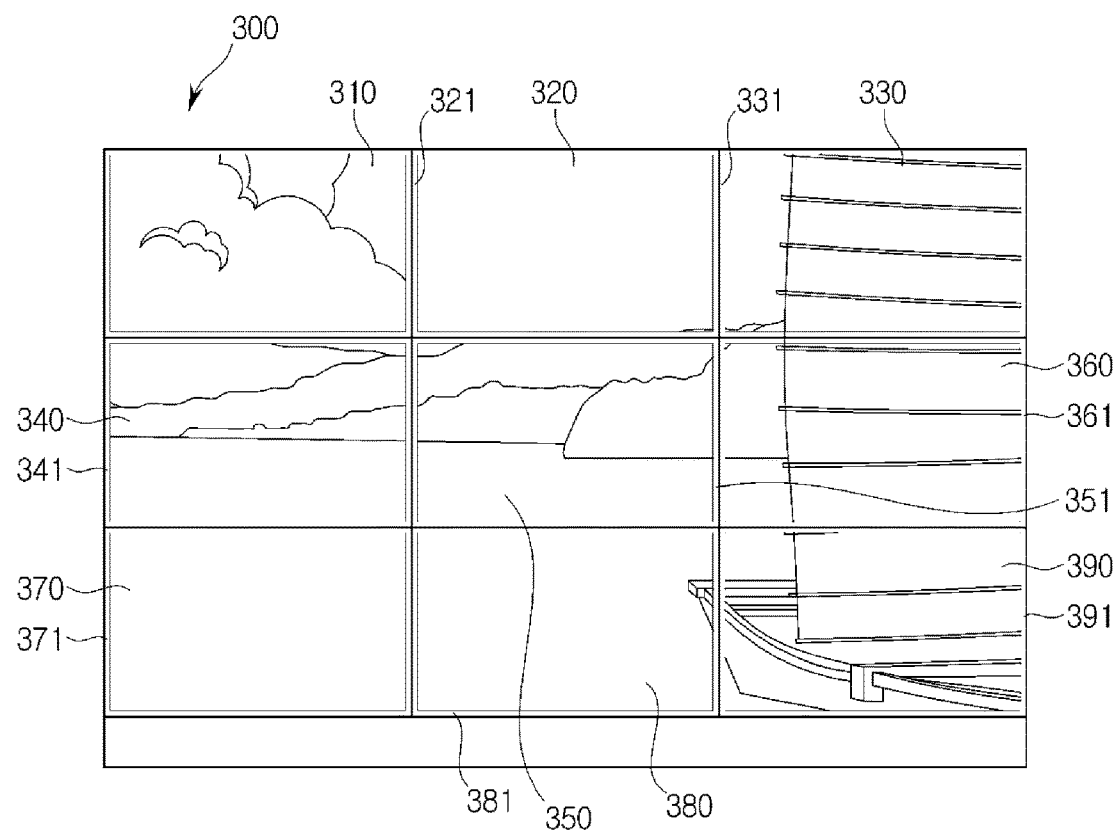
FIG. 9 is a front view illustrating a display system according to an exemplary embodiment.
Figure 10:
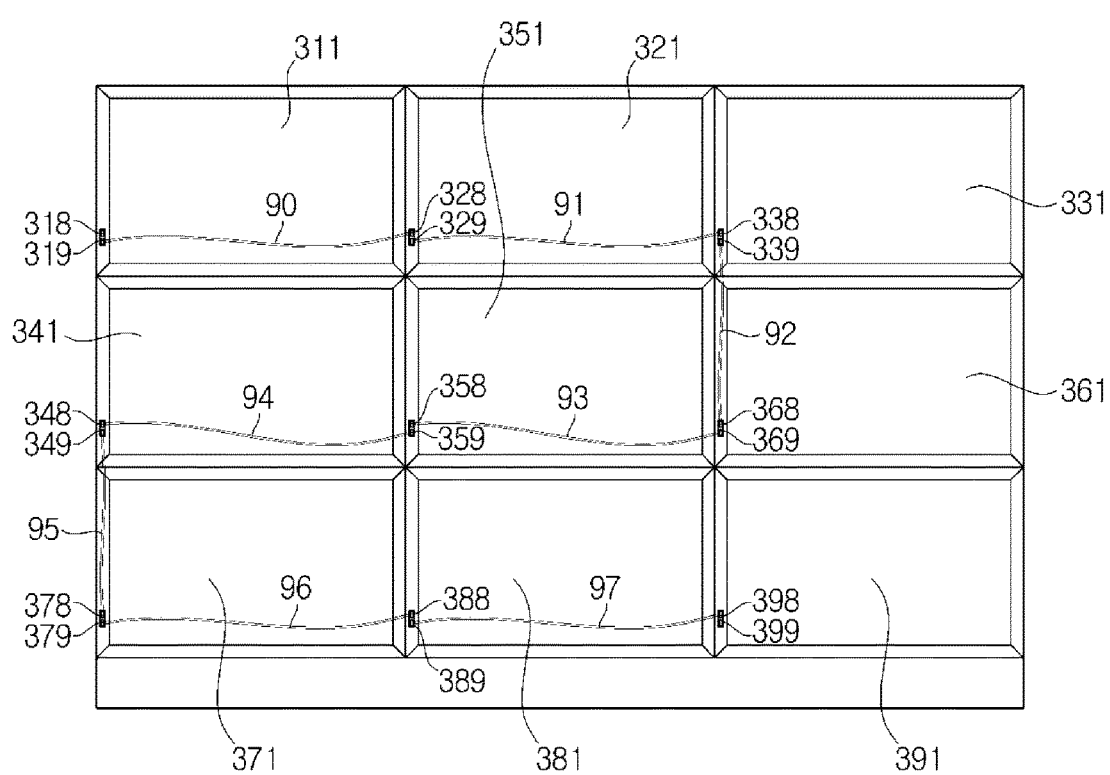
FIG. 10 is a rear view illustrating a display system according to an exemplary embodiment.

FIG. 9 is a front view illustrating a display system according to an exemplary embodiment. FIG. 10 is a rear view illustrating a display system according to an exemplary embodiment.

Referring to FIGS. 9 and 10, the display system 2 according to another exemplary embodiment may include a plurality of display apparatuses 310-390. Individual display apparatuses 310-390 may be arranged relative to the other display apparatuses 310-390, and/or may be stacked, so that a collective configuration of the display apparatuses 310-390 is achieved. Therefore, a plurality of display apparatuses 310-390 may be combined with each other so that one large-sized screen image can be formed. The display apparatuses 310-390 may respectively include housings 311-391, each of which includes a display panel and a display panel fixed thereto and various constituent components embedded therein. Each display panel may be connected to the housing through a bezel. The display panel can be implemented by at least one of various display panels, for example, a light emitting diode (LED) display panel, an organic light emitting diode (OLED) display panel, an active-matrix organic light emitting diode (AM OLED) display panel, a liquid crystal display (LCD) panel, a plasma display panel (PDP) display panel, etc. The housings 311-391 exposed to the front side and the bezel may be minimized for visual convenience of a TV viewer.

A plurality of terminals 318, 319, 328, 329, 338, 339, 348, 349, 358, 359, 368, 369, 378, 379, 388, 389, 398, 399 through which individual display apparatuses 310-390 can be connected to an external device may be provided at a back surface or a lateral surface of the housings 311-391 of the display apparatuses (310 to 390). The display apparatuses 310-390 may be interconnected through terminals 318, 319, 328, 329, 338, 339, 348, 349, 358, 359, 368, 369, 378, 379, 388, 389, 398, 399 and cables 90-97 interconnecting the terminals. The display apparatuses 310-390 may include transmission (Tx) terminals 319, 329, 339, 349, 359, 369, 379, 389, 399 needed for data transmission and reception (Rx) terminals 318, 328, 338, 348, 358, 368, 378, 388, 398 needed for data reception. At least one of the display apparatuses 310-390 according to the embodiment may include a plurality of Tx terminals or a plurality of Rx terminals.

Figure 11:
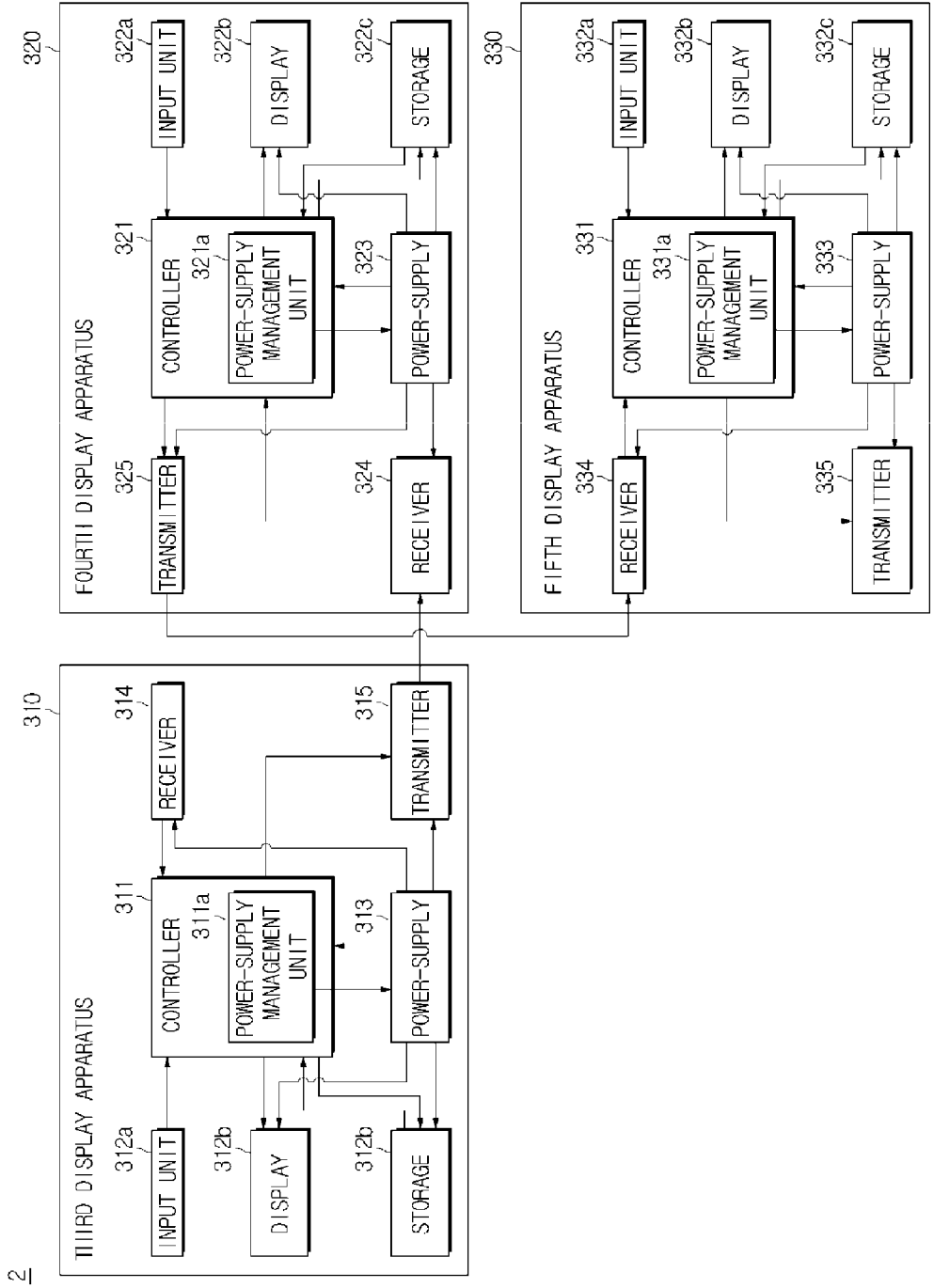
FIG. 11 is a block diagram illustrating a display system according to an exemplary embodiment.

FIG. 11 is a block diagram illustrating a display system according to an exemplary embodiment.

In accordance with one exemplary embodiment, the display apparatuses 310-390 may be sequentially interconnected according to a predetermined order. For example, the Rx terminal 328 of the fourth display apparatus 320 is connected to the Tx terminal 319 of the third display apparatus 310 through one cable 90. In addition, the Tx terminal 329 of the fourth display apparatus 320 may be connected to the Rx terminal 338 of the fifth display apparatus 330 through a different cable 91. In addition, the Tx terminal 339 of the fifth display apparatus 330 may be connected to the Rx terminal 348 of the sixth display apparatus 340 through a cable 92.

Referring to FIG. 11, the third to fifth display apparatuses 310, 320, 330 may respectively include controllers 311, 321, 331, power-supply management units 311a, 321a, 331a, input units 312a, 322a, 332a, displays 312b, 322b, 332b, storages 312b, 322b, 332b, power-supplies 313, 323, 333, receivers 314, 324, 334, and transmitters 315, 325, 335. The controllers 311, 321, 331, the power-supply management units 311a, 321a, 331a, the input units 312a, 322a, 332a, the displays 312b, 322b, 332b, the storages 312b, 322b, 332b, the power-supplies 313, 323, 333, the receivers 314, 324, 334 and the transmitters 315, 325, 335 may be identical to those of the first display apparatus 100 and the second display apparatus 200, or may be different from those of the first display apparatus 100 and the second display apparatus 200 within the scope devised by those skilled in the art. A detailed description thereof has already been disclosed with reference to the first display apparatus 100 and the second display apparatus 200, and as such redundant detailed description thereof will herein be omitted for convenience of description.

If the third to fifth display apparatuses 310-330 are sequentially interconnected, the transmitter 315 of the third display apparatus 310 may be connected to the receiver 324 of the fourth display apparatus 320 through the cable, and the transmitter 325 of the fourth display apparatus 320 may be connected to the receiver 334 of the fifth display apparatus 330 through the cable.

If the third display apparatus 310 transitions from the power saving state to the wake-up state according to user manipulation or predefined setting, a voltage is applied to the voltage receiver such as a pull-up resistor contained in the transmitter 315 of the third display apparatus 310, and a voltage (i.e., first voltage) of the channel may be changed according to the received voltage. If a channel voltage of the transmitter 315 is changed, a voltage (i.e., second voltage) of the receiver 324 of the fourth display apparatus 320 may be changed. The sensing unit such as a detector pin contained in the receiver 324 of the fourth display apparatus 320 may detect a voltage variation of a channel of the receiver 324, and may transmit the sensing result to the power-supply management unit 321a of the fourth display apparatus 320. If a voltage variation of the channel of the receiver 324 is detected, the power-supply management unit 321a may output a wake-up signal for allowing the fourth display apparatus 320 to transition from the power saving state to the wake-up state, and may output a voltage to each component of the fourth display apparatus 320 according to the wake-up signal, so that the fourth display apparatus 320 can transition from the power saving state to the wake-up state.

Meanwhile, if the fourth display apparatus 320 transitions from the power saving state to the wake-up state, a voltage is applied to the voltage receiver contained in the transmitter 325 of the fourth display apparatus 320, so that a channel voltage of the transmitter 325 may be changed in response to the received voltage. As a result, a channel voltage of the receiver 334 of the fifth display apparatus 330 may also be changed as described above, and the sensing unit contained in the receiver 334 of the fifth display apparatus 330 may detect a voltage variation of the channel of the receiver 334 and may transmit the sensing result to the power-supply management unit 331a of the fifth display apparatus 330. In accordance with the sensing result, the power-supply management unit 331a may output the wake-up signal so that the fifth display apparatus 330 can transition from the power saving state to the wake-up state.

As described above, other display apparatuses connected to the fifth display apparatus 330 may transition from the power saving state to the wake-up state, the same processes as described above are equally applied to the other apparatuses, all display apparatuses 310-390 of the display system 2 may sequentially wake.

Figure 12:
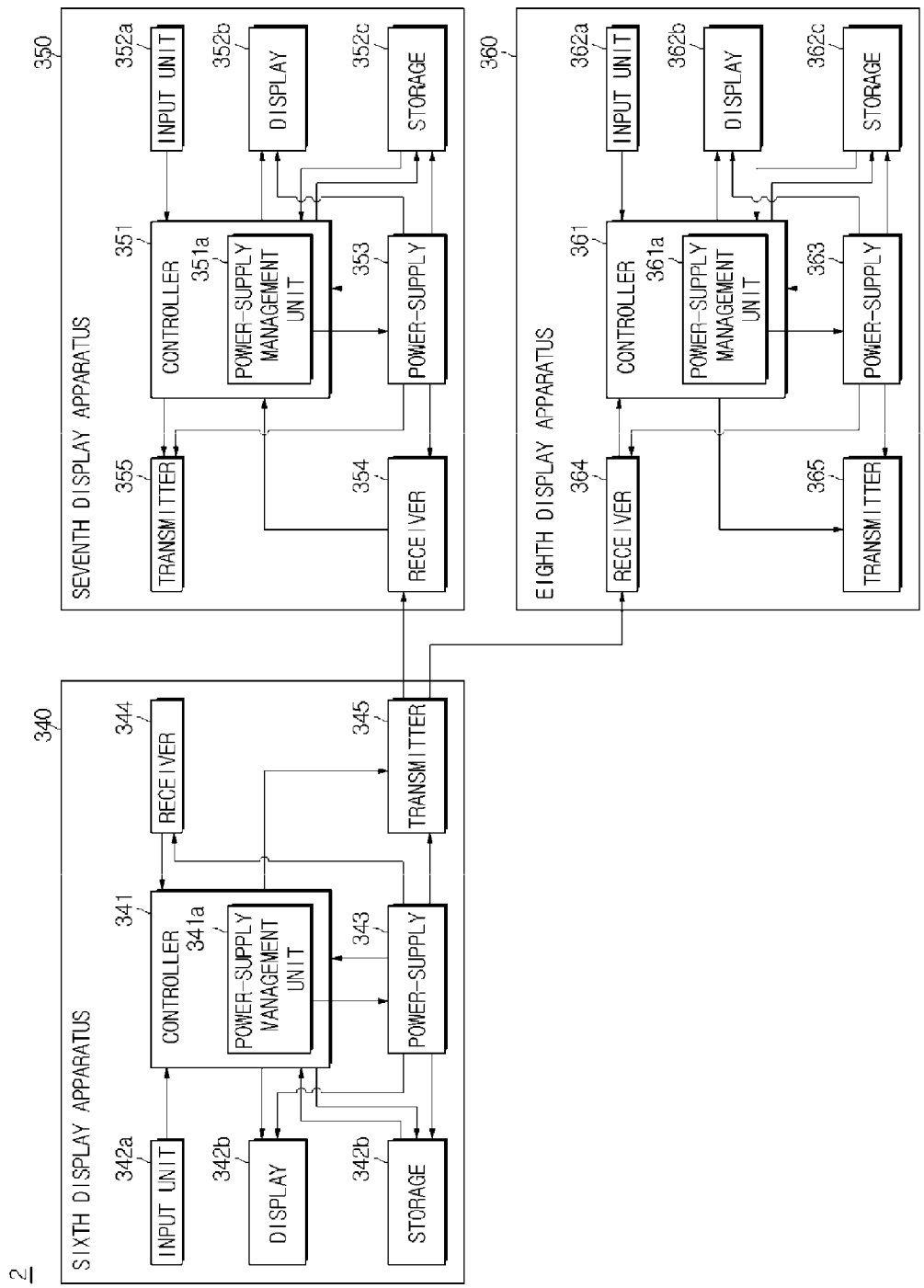
FIG. 12 is a block diagram illustrating a display system according to an exemplary embodiment.

FIG. 12 is a block diagram illustrating a display system according to an exemplary embodiment.

In accordance with another embodiment, at least one of the display apparatuses 310-390 may be connected to at least two of the display apparatuses 310-390.

In accordance with one exemplary embodiment, at least one display apparatus may include a plurality of transmission (Tx) terminals, and each Tx terminal may be connected to reception (Rx) terminals provided in at least two display apparatuses 310-390 through a cable. At least one display apparatus may be connected to the same or smaller number of display apparatuses than the number of transmission (Tx) terminals.

In accordance with another exemplary embodiment, one display apparatus may be connected to a plurality of display apparatuses through one Tx terminal. In this case, a separate adaptor may be mounted to a Tx terminal of one display apparatus, or a branch cable is coupled to a Tx terminal, so that one Tx terminal may be connected to Rx terminals of at least two display apparatuses 310-390 through the cable. For example, as can be seen from FIG. 12, the transmitter 345 of the sixth display apparatus 340 may be connected to the receiver 354 of the seventh display apparatus 350 and the receiver 364 of the eighth display apparatus 360. In this case, if the sixth display apparatus 340 transitions from the power saving state to the wake-up state, a voltage is applied to the voltage receiver contained in the transmitter 345 of the sixth display apparatus 340, and a voltage of the channel of the transmitter 345 may be changed according to the received voltage. In the same manner as described above, a voltage of the channel of the receiver 354 of the seventh display apparatus 350 may be changed. In addition, the channel voltage of the receiver 364 of the eighth display apparatus 360 may also be changed. The sensing unit contained in the receiver 354 of the seventh display apparatus 350 may detect variation of the channel voltage of the receiver 354, and the sensing unit contained in the receiver 364 of the eighth display apparatus 360 may detect variation of the channel voltage of the receiver 364. The sensing result sensed by the individual sensing units may be respectively applied to the power-supply management unit 351a of the seventh display apparatus 350 and the power-supply management unit 361a of the eighth display apparatus 360. Each of the power-supply management units (351a, 361a) may output the wake-up signal in response to the sensing result. Accordingly, the seventh display apparatus 350 and the eighth display apparatus 360 may transition from the power saving state to the wake-up state.

By the above-mentioned processes, all the display apparatuses 310-390 may simultaneously or sequentially wake.

The display system 2 may wake all the display apparatuses 310-390 according to the embodiment shown in FIG. 11, may wake all the display apparatuses 310-390 according to the embodiment shown in FIG. 12, and may also wake all the display apparatuses 310-390 by combining the embodiment of FIG. 11 with the embodiment of FIG. 12.

If all the display apparatuses 310-390 contained in the display system 2 awake through the above-mentioned method, sleep-mode display apparatuses need not be in the standby mode until the wakeup-mode display apparatuses stop driving of the system program, so that a time consumed for awaking all the display apparatuses 310-390 can be reduced.

A method for controlling the display system according to various embodiments will hereinafter be described with reference to FIGS. 13 to 15.

Figure 13:
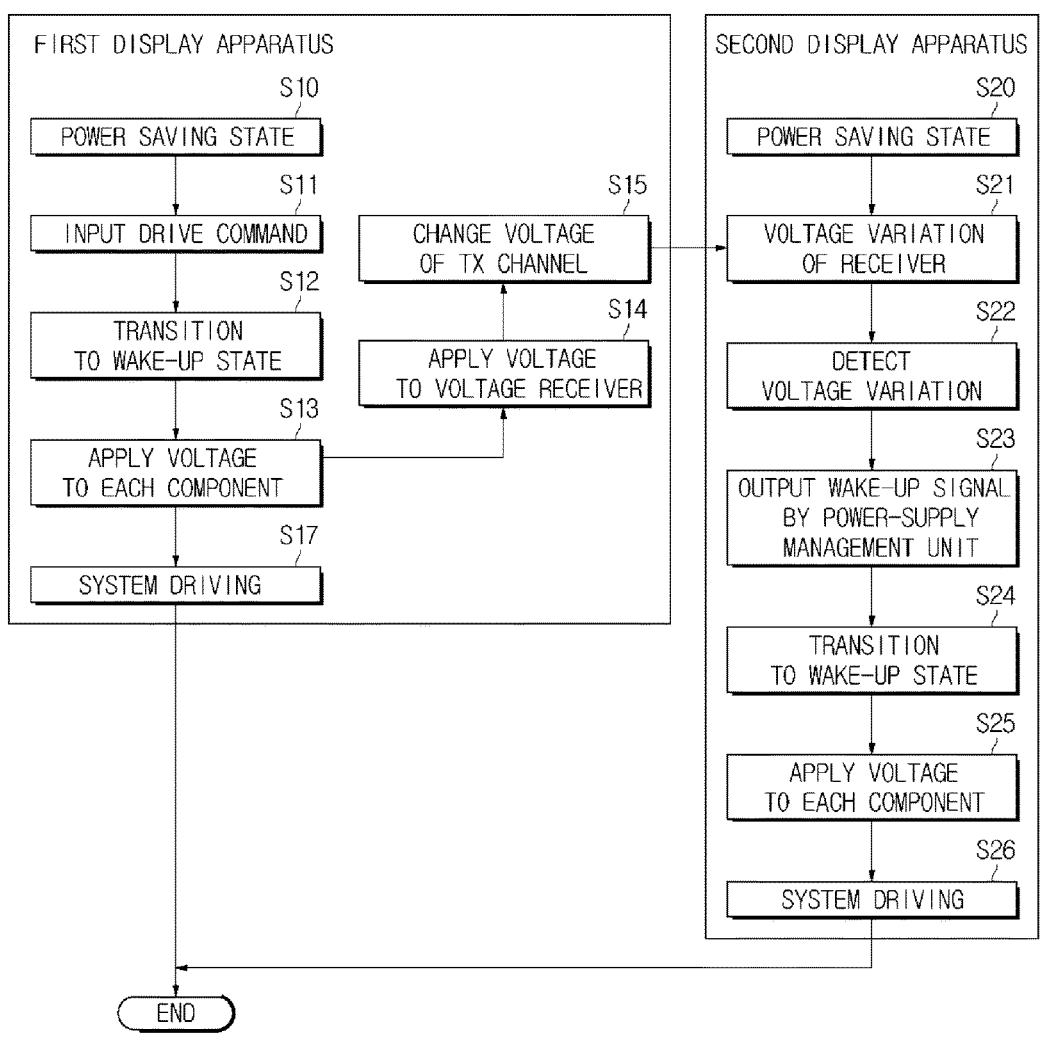
FIG. 13 is a flowchart illustrating a method for controlling the display system according to an exemplary embodiment.

FIG. 13 is a flowchart illustrating a method for controlling the display system according to an exemplary embodiment.

Referring to FIG. 13, the display system may include a first display apparatus and a second display apparatus. The first display apparatus and the second display apparatus may be electrically interconnected using various interface technologies, for example, wireless communication, display port, HDMI (High Definition Multimedia Interface), DVI (Digital Visual Interface), and UDI (Unified Display Interface). For electrical connection between the first display apparatus and the second display apparatus, the cable corresponding to the applied interface technology may be used. For example, the first display apparatus may be connected to the second display apparatus through the display port cable.

The first display apparatus and the second display apparatus may stay in the power saving state in operations (S10, S20). If the first display apparatus receives a drive command of the system or if a condition is satisfied according to the predefined setting in operation S11, the first display apparatus may transition to the wake-up state according to control of the power-supply management unit of the first display apparatus in operation S12. In this case, the power-supply management unit may control the first display apparatus to transition from the power saving state to the wake-up state using VESA DPMS (Display Power Management Signaling), or may control the first display apparatus to transition from the power saving state to the wake-up state.

In this case, a voltage may be applied to individual components of the first display apparatus in operation S13, and a predetermined voltage may also be applied to the voltage receiver of the transmitter of the first display apparatus in operation S14. In this case, the transmitter may include a voltage receiver and a transmission (Tx) channel connected to the voltage receiver. In accordance with one embodiment, the voltage receiver may include a pull-up resistor, and the Tx channel may include an AUX–channel according to an embodiment. If a predetermined voltage is applied to the voltage receiver in operation S14, a first voltage of the Tx channel connected to the voltage receiver may be changed in operation S15.

If the first voltage of the Tx channel is changed in operation S15, the second voltage of the Rx channel of the receiver of the second display apparatus may be changed in operation S21. The Rx channel may include the AUX–channel. The Rx channel may be connected to a pull-down resistor.

If the second voltage of the Rx channel is changed in operation S21, the sensing unit may detect variation of the second voltage, and may output the sensing result in operation S22. The sensing unit may be implemented by a detector pin. The detector pin may be driven even when the second display apparatus stays in the power saving state.

The sensing result may be applied to the power-supply management unit. The power-supply management unit may output the wake-up signal according to the sensing result of the sensing unit in operation S23. Accordingly, the second display apparatus may transition from the power saving state to the wake-up state in operation S24.

If the second display apparatus transitions to the wake-up state, individual components of the second display apparatus may be powered on in operation S25. If the controller of the second display apparatus is powered on, the controller retrieves and drives system software so that the second display apparatus can be driven and controlled by the system software in operation S26.

Meanwhile, a voltage may also be applied to individual components of the first display apparatus in operation S13, and the controller of the first display apparatus may retrieve and drive the system software so that the first display apparatus can be driven in operation S17.

Accordingly, the first display apparatus and the second display apparatus may be independently driven. In other words, the second display apparatus may transition to the wake-up state independently of the system driving S17 of the first display apparatus, so that the second display apparatus can start driving of the system.

Therefore, because a plurality of display apparatuses of the display system can quickly transition to the wake-up state, the plural display apparatuses can more quickly drive the system, so that a system driving speed of the overall display system becomes faster.

Figure 14A:
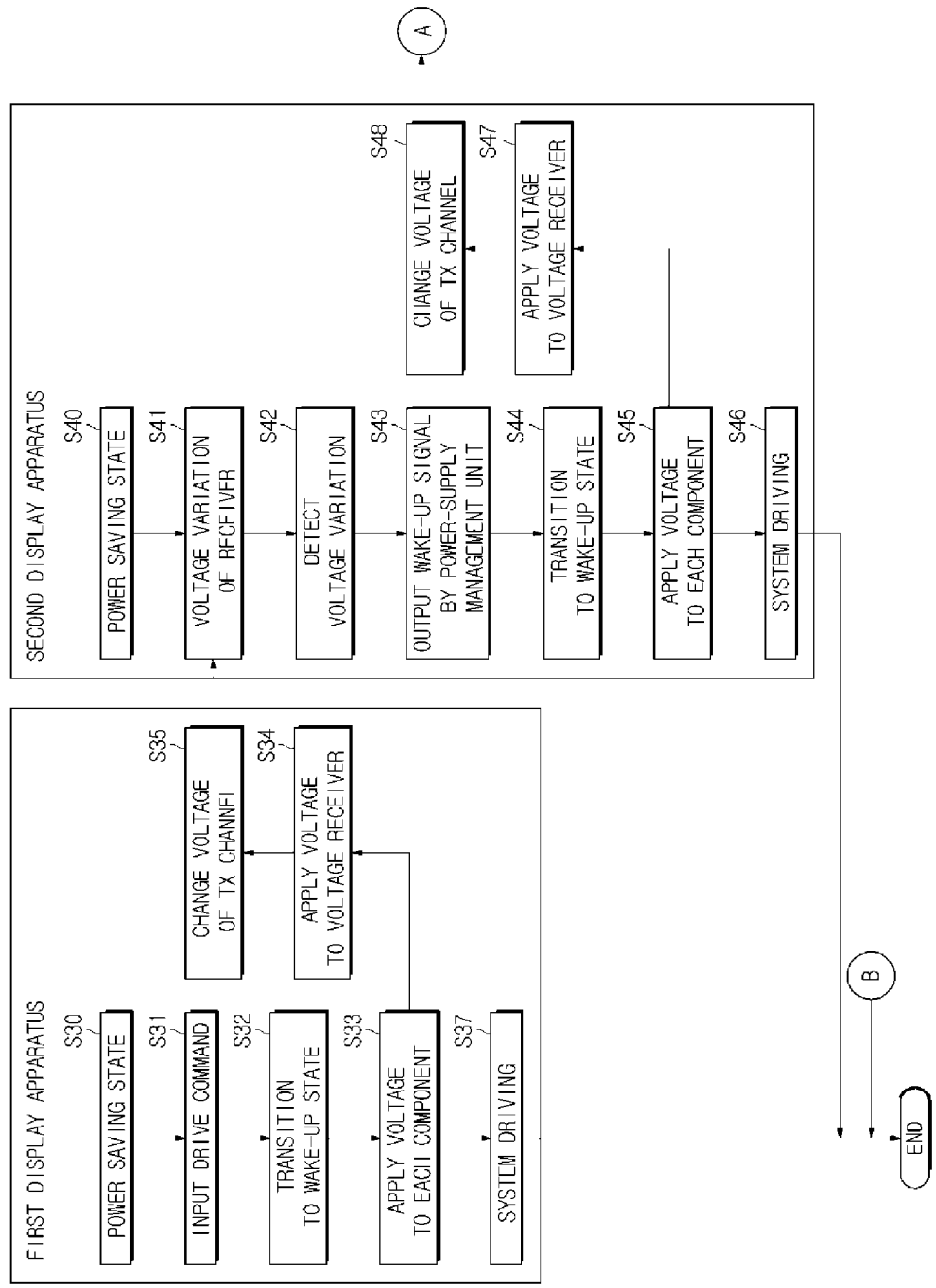
FIGS. 14A and 14B are flowcharts illustrating a method for controlling a display system according to an exemplary embodiment.
Figure 14B:
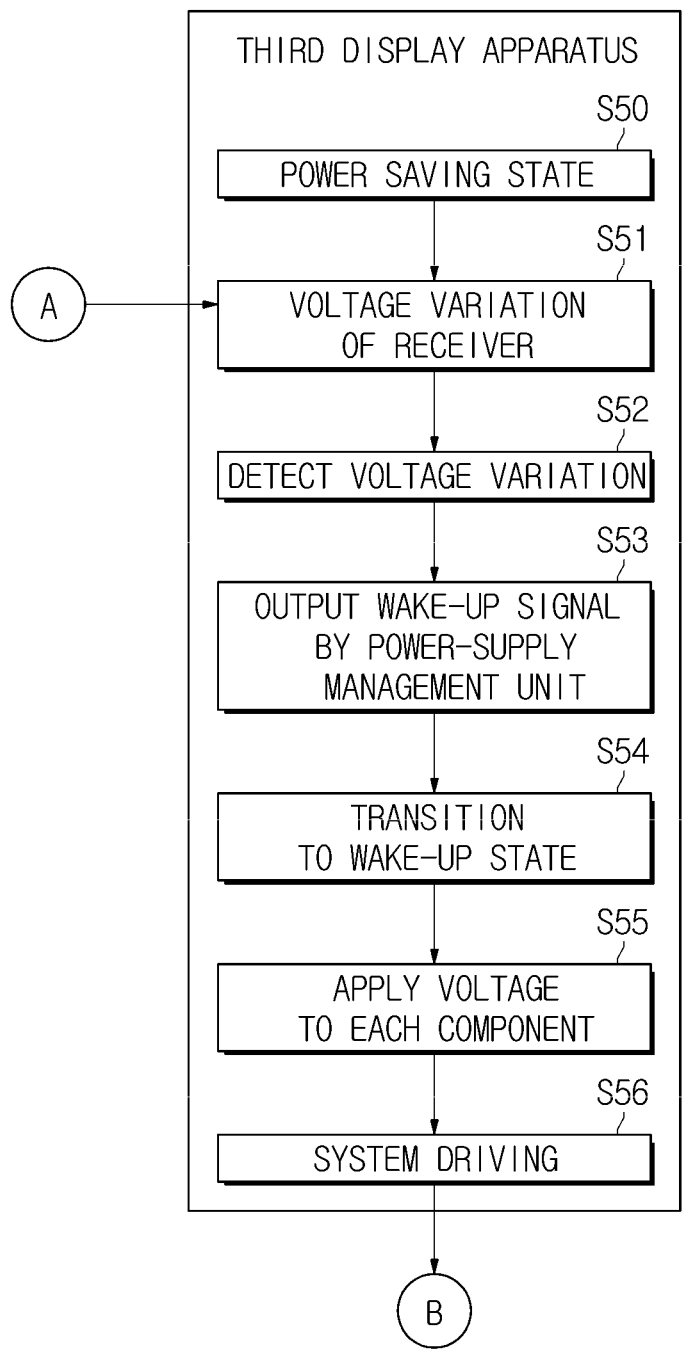

FIGS. 14A and 14B are flowcharts illustrating a method for controlling a display system according to an exemplary embodiment.

Referring to FIGS. 14A and 14B, the display system may include a first display apparatus, a second display apparatus, and a third display apparatus. The first display apparatus, the second display apparatus, and the third display apparatus may be electrically interconnected using various interface technologies, for example, wireless communication, display port, HDMI (High Definition Multimedia Interface), DVI (Digital Visual Interface), and UDI (Unified Display Interface). The first display apparatus, the second display apparatus, and the third display apparatus may be electrically interconnected through a cable corresponding to interface technology. In this case, the first display apparatus may be electrically connected to the second display apparatus, and the second display apparatus may be electrically connected to the third display apparatus.

In a method for controlling the display system according to another exemplary embodiment, the first display apparatus, the second display apparatus, and the third display apparatus may stay in the power saving state in operations (s30, s40, s50). If the first display apparatus receives a drive command of the system or if a condition is satisfied according to the predefined setting in operation S31, the first display apparatus may transition to the wake-up state according to control of the power-supply management unit of the first display apparatus in operation S32. In accordance with one exemplary embodiment, the first display apparatus may transition from the power saving state to the wake-up state using VESA DPMS, or may transition from the power saving state to the wake-up state.

Meanwhile, if the first display apparatus transitions from the power saving state to the wake-up state in operation S32, a voltage may be applied to individual components of the first display apparatus in operation S33. In this case, a predetermined voltage may also be equally applied to the voltage receiver of the transmitter of the first display apparatus in operation S34. As a result, the first voltage of the Tx channel connected to the voltage receiver may be changed in operation S35.

If the first voltage of the Tx channel is changed in operation S35, the second voltage of the Rx channel of the receiver of the second display apparatus connected to the transmitter of the first display apparatus may also be changed in operation S41.

If the second voltage of the Rx channel is changed in operation S41, the sensing unit may detect variation of the second voltage and may output the sensing result, and the sensing result may be applied to the power-supply management unit in operation S42.

The power-supply management unit may output a wake-up signal signaling the second display apparatus to transition to the wake-up state according to the sensing result of the sensing unit in operation S43, and the second display apparatus may transition from the power saving state to the wake-up state in operation S44.

If the second display apparatus transitions to the wake-up state, individual components of the second display apparatus may be powered on in operation S45. In this case, a voltage may also be applied to the voltage receiver of the transmitter of the second display apparatus in operation S47. In the same manner as described above, a third voltage of the Tx channel of the transmitter of the second display apparatus may be changed in operation S48.

If the third voltage of the Tx channel of the transmitter of the second display apparatus is changed in operation S48, a fourth voltage of the Rx channel of the receiver of the third display apparatus connected to the transmitter of the second display apparatus may also be changed in operation S51.

The sensing unit of the third display apparatus may detect variation of the fourth voltage in operation S52 and may output the sensing result, and the sensing result may be applied to the power-supply management unit.

The power-supply management unit may output a wake-up signal for allowing the third display apparatus to transition to the wake-up state according to the sensing result of the sensing result in operation S53, and the third display apparatus may transition from the power saving state to the wake-up state in operation S54.

If the third display apparatus transitions to the wake-up state, individual components of the third display apparatus may be powered on in operation S55, and the controller of the third display apparatus may retrieve and drive the system software in operation S56.

On the other hand, because a voltage is applied to individual components of the first display apparatus in operation S13, a voltage may also be applied to the controller of the first display apparatus. The controller of the first display apparatus may retrieve and drive the system software according to voltage reception, so that the controller can drive the first display apparatus in operation S37.

In addition, the second display apparatus may allow the system to be driven because a voltage is applied (S45) to individual components of the second display apparatus in operation S46.

By the above-mentioned processes, the first display apparatus, the second display apparatus, and the third display apparatus may be independently driven. In other words, the first display apparatus, the second display apparatus, and the third display apparatus may independently transition to the wake-up state and may perform system driving, irrespective of whether systems of other devices are driven.

Therefore, a plurality of display apparatuses of the display system can more quickly transition to the wake-up state, so that the driving speed of the system of several display apparatuses can also be improved.

Figure 15A:
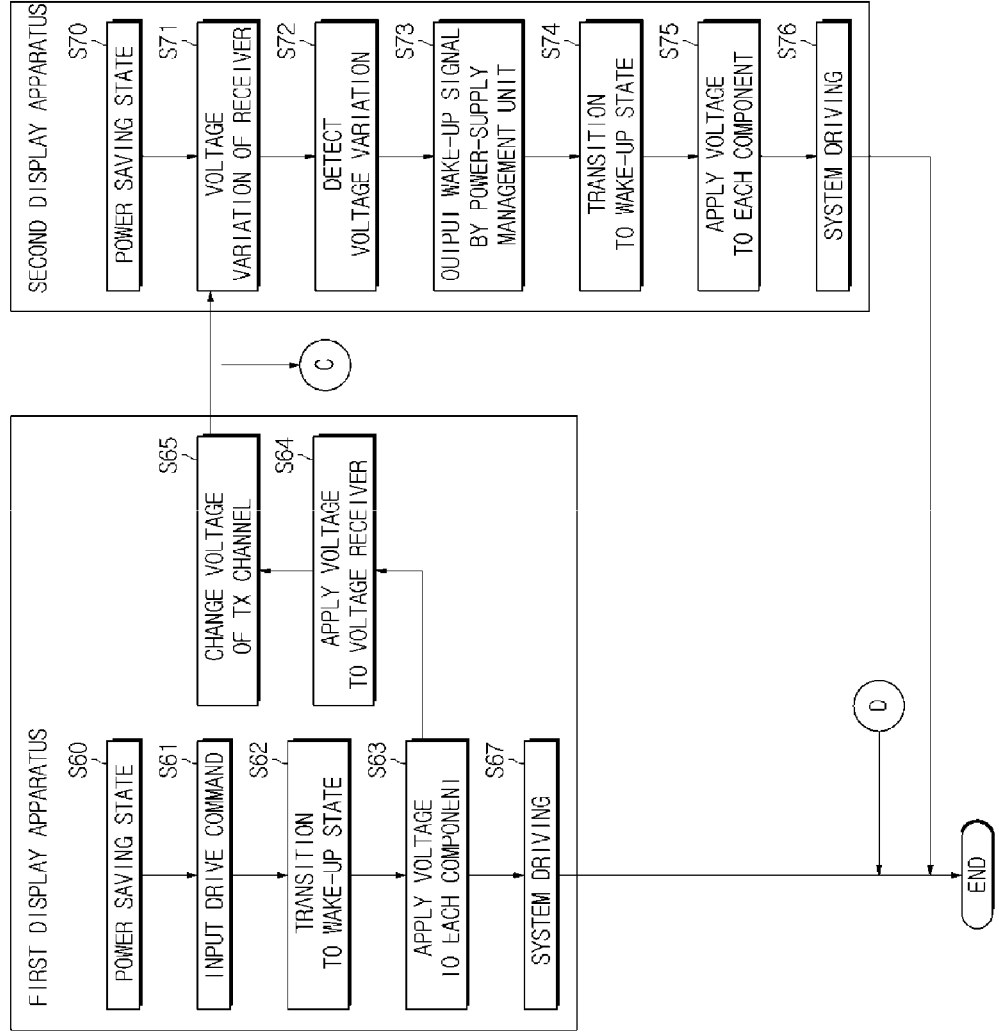
FIGS. 15A and 15B are flowcharts illustrating a method for controlling a display system according to an exemplary embodiment.
Figure 15B:
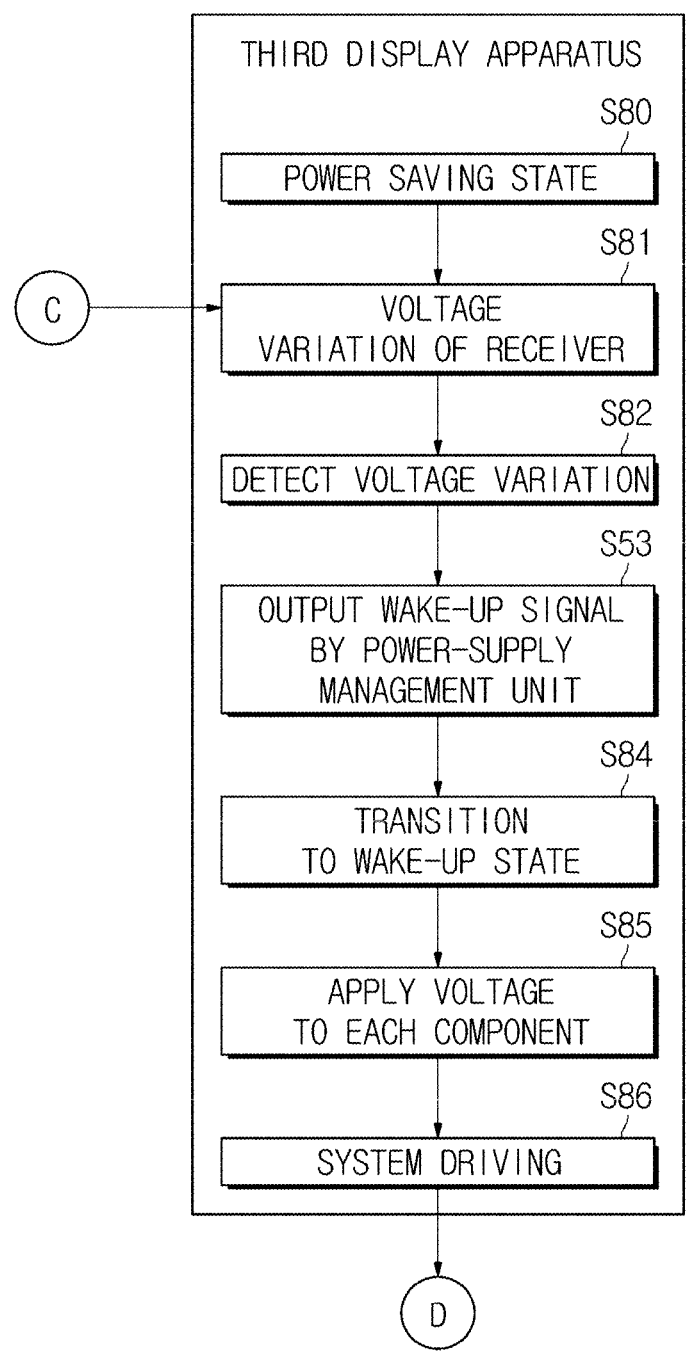

FIGS. 15A and 15B are flowcharts illustrating a method for controlling a display system according to an exemplary embodiment.

Referring to FIGS. 15A and 15B, the display system may include a first display apparatus, a second display apparatus, and a third display apparatus. The first to third display apparatuses may be electrically interconnected as necessary. In accordance with one exemplary embodiment, the first display apparatus may be electrically connected to the second display apparatus and the third display apparatus. The second display apparatus and the third display apparatus may not be electrically interconnected. In this case, the first display apparatus may include a plurality of transmitters. One of the transmitters may be connected to the receiver of the second display apparatus, the other one may be connected to the receiver of the third display apparatus. In accordance with one embodiment, the first display apparatus may include one transmitter, and one transmitter of the first display apparatus may also be connected to the receiver of the second display apparatus and the receiver of the third display apparatus using a separate adaptor or a branch cable, etc.

As described above, the first display apparatus, the second display apparatus, and the third display apparatus may be electrically interconnected using various interface technologies. To electrically interconnect the first display apparatus, the second display apparatus, and the third display apparatus, a predetermined cable may be used.

In a method for controlling the display system shown in FIGS. 15A and 15B according to another exemplary embodiment, the first display apparatus, the second display apparatus, and the third display apparatus may stay in the power saving state in operations (S60, S70, S80). If the first display apparatus receives a drive command of the system or if a condition is satisfied according to the predefined setting in operation S61, the first display apparatus may transition to the wake-up state according to control of the power-supply management unit of the first display apparatus in operation S62.

If the first display apparatus transitions from the power saving state to the wake-up state in operation S62, a voltage may be applied to individual components of the first display apparatus in operation S63. As described above, a predetermined voltage may be applied to the voltage receiver of the transmitter of the first display apparatus in operation S64, so that the first voltage of the Tx channel, which is connected to the voltage receiver of the first display apparatus and provided in the transmitter, may be changed in operation S65.

Because the receiver of the second display apparatus and the receiver of the third display apparatus may be connected to the transmitter of the first display apparatus as described above, the second voltage (S71) of the Rx channel of the receiver of the second display apparatus and the third voltage of the Rx channel of the receiver of the third display apparatus may be changed in operation S81 according to variation (S65) of the first voltage of the Tx channel of the first display apparatus. In this case, the second voltage and the third voltage may be simultaneously changed or variably changed at different times.

The sensing unit of the second display apparatus may detect variation of the second voltage, and may output the sensing result in operation S72. The sensing result may be applied to the power-supply management unit of the second display apparatus.

The power-supply management unit of the second display apparatus may output a wake-up signal for allowing the second display apparatus to transition to the wake-up state according to the sensing result of the sensing unit in operation S73, and the second display apparatus may transition from the power saving state to the wake-up state in operation S74.

If the second display apparatus transitions to the wake-up state, individual components of the second display apparatus may be powered on in operation S75. The controller of the second display apparatus may retrieve and drive the system software according to power reception in operation S76.

In the same manner as in the second display apparatus, the third display apparatus may detect variation of the third voltage using the sensing unit of the third display apparatus in operation S82. According to the sensing result, the third display apparatus may transition from the power saving state to the wake-up state upon receiving the wake-up signal from the power-supply management unit in operations (S83, S84). Therefore, the second display apparatus may transition.

If the third display apparatus transitions to the wake-up state, individual components of the third display apparatus may be powered on in operation S85, and the controller of the third display apparatus may retrieve and drive the system software according to power reception in operation S86. Therefore, the third display apparatus may also transition.

In addition, the controller of the first display apparatus may retrieve and drive the system software because a voltage is applied to individual components of the first display apparatus in operation S63, so that the first display apparatus can be driven in operation S67.

As a result, the second display apparatus and the third display apparatus may transition to the wake-up state without receiving a separate control signal from the first display apparatus or the like, and may perform system driving. Therefore, the first display apparatus, the second display apparatus, and the third display apparatus may be independently driven irrespective of driving of a system of another apparatus.

Accordingly, several display apparatuses of the display system can quickly transition to the wake-up state, and the system of the display apparatuses can be driven.

As is apparent from the above description, the display apparatus, the display system having a plurality of display apparatuses, and the method for controlling the display system according to the embodiments can reduce a wake-up time of a plurality of display apparatuses having a power saving mode, so that the plurality of display apparatuses can quickly wake from the power saving mode.

The display apparatus, the display system having a plurality of display apparatuses, and the method for controlling the display system according to the embodiments can sequentially wake up a plurality of interconnected display devices within a shorter time.

The display apparatus, the display system having a plurality of display apparatuses, and the method for controlling the display system according to the exemplary embodiments can wake up a rear display apparatus before a front display apparatus from among the interconnected display apparatuses is driven.

Although a few exemplary embodiments have been shown and described, it would be appreciated by those skilled in the art that changes may be made in these embodiments without departing from the principles and spirit of the invention, the scope of which is defined in the claims and their equivalents.

What is claimed is:

1. A display system comprising:
a first display apparatus comprising:
a controller configured to transition the first display apparatus from a power saving state to a wake-up state; and
a first transceiver configured to transition a voltage of a first transmission channel from a first voltage associated with the power saving state to a second voltage associated with the wake-up state, in response to the controller transitioning the first display apparatus from the power saving state to the wake-up state; and
a second display apparatus electrically connected to the first display apparatus, the second display apparatus comprising:
a second transceiver configured to detect variation of a voltage of a first reception channel corresponding to the transition from the first voltage of the first transmission channel associated with the power saving state to the second voltage associated with the wake-up state; and
a controller configured to transition the second display apparatus from a power saving state to a wake-up state, in response to the transceiver of the second display detecting the variation of the voltage of the first reception channel,
wherein the first transceiver includes a first voltage receiver configured to receive a voltage when the first display apparatus transitions to a wake-up state, and including a pull-up resistor,
wherein the first reception channel is connected to a pull down resistor, and
wherein the variation of the second voltage is generated by the pull-up resistor and the pull-down resistor.

2. The display system according to claim 1, wherein the first display apparatus and the second display apparatus are electrically connected through a display port (DP) cable.

3. The display system according to claim 1, wherein the second transceiver comprises:
a detector pin configured to detect the variation of the voltage of the first reception channel.

4. The display system according to claim 1, wherein the second display apparatus comprises:
a second voltage receiver configured to receive voltage when the second display apparatus transitions to a wake-up state; and
a second transmission channel connected to the second voltage receiver,
wherein a voltage of the second transmission channel is transitioned from the first voltage associated with the power saving state to the second voltage associated with the wake-up state, in response to the controller of the second display apparatus transitioning the first display apparatus from the power saving state to the wake-up state based on voltage applied to the second voltage receiver.

5. The display system according to claim 4, further comprising:
a third display apparatus electrically connected to the first display apparatus or the second display apparatus, the third display apparatus comprising:
a third transceiver configured to detect variation of a voltage of a second reception channel corresponding to the transition from the first voltage of the first transmission channel to the second voltage of the first transmission channel or corresponding to transition of voltage of the second transmission channel from the first voltage to the second voltage; and
a controller configured to transition the third display apparatus from the power saving state to the wake-up state, in response to the third transceiver of the third display apparatus detecting the variation of the voltage.

6. The display system according to claim 1, wherein the first transmission channel and the first reception channel comprises an AUX minus channel (AUX−channel).

7. The display system according to claim 1, wherein the controller of the first display apparatus drives the first display apparatus during the wake-up state, and the controller of the second display apparatus transitions the second display apparatus to a wake-up state independently from the driving of the first display apparatus.

8. A method for controlling a display system including a plurality of interconnected display apparatuses, comprising:
transitioning a first display apparatus among the plurality of apparatuses from a power saving state to a wake-up state;
applying a voltage to a first voltage receiver, a voltage when the first display apparatus transitions to a wake-up state, wherein the first voltage receiver includes a pull-up resistor;
changing a first voltage of a first transmission channel of the first display apparatus from a first voltage associated with the power saving state to a second voltage associated with the wake-up state, based on the transitioning;
detecting variation of a second voltage of a voltage of a reception channel of a second display apparatus among the plurality of apparatuses corresponding to the transition from the first voltage of the first transmission channel associated with the power saving state to the second voltage associated with the wake-up state, wherein the reception is connected to a pull down resistor; and
transitioning the second display apparatus from the power saving state to the wake-up state, in response to the detecting,
wherein the variation of the second voltage is generated by the pull-up resistor and the pull-down resistor.

9. The method according to claim 8, wherein the first display apparatus and the second display apparatus are electrically connected through at least one display port (DP) cable.

10. The method according to claim 8, wherein the detecting comprises detecting the variation using a detector pin of the second display apparatus.

11. The method according to claim 8, further comprising:
applying a voltage to a second voltage receiver connected to a second transmission channel, when the second display apparatus transitions to the wake-up state; and
changing a voltage of the second transmission channel according to a voltage applied to the second voltage receiver.

12. The method according to claim 11, further comprising:
changing a voltage of a second reception channel of a third display apparatus according to variation of voltage of the first transmission channel of the first display apparatus or according to variation of voltage of the second transmission channel of the second display apparatus;

detecting variation of voltage of a second reception channel of the third display apparatus; and transitioning the third display apparatus from a power saving state to a wake-up state in response to the detecting.

13. The method according to claim 8, wherein the first transmission channel and the first reception channel comprises an AUX minus channel (AUX−channel).

14. The method according to claim 8, further comprising:

performing system driving of the first display apparatus during the wake-up state, wherein the transitioning the second display apparatus from the power saving state to the wake-up state is performed independently from the system driving of the first display apparatus.

15. A display apparatus comprising:

a first reception channel electrically connected to a first transmission channel of an external display apparatus, the first reception channel configured to perform variation of voltage of the first reception channel in response to variation of a voltage of the first transmission channel;

a sensing unit configured to detect the variation of the voltage of the first reception channel; and a power-supply management unit configured to output a wake-up signal in response to the sensing unit detecting the variation of the voltage of the first reception channel, wherein the first reception channel is connected to a pull down resistor, and wherein the variation of the voltage is generated by a pull-up resistor provided in the external display apparatus and the pull-down resistor.

16. The display apparatus according to claim 15, further comprising:

a voltage receiver configured to receive a voltage based on the wake-up signal; and a second transmission channel configured to change a voltage of the second transmission channel in response to the voltage receiver receiving the voltage.

17. A display system comprising:

a first display apparatus configured to output an electric signal in response to a voltage applied to one or more components when the first display apparatus transitions from a power saving state to a wake-up state; and a second display apparatus configured to detect the electric signal and transition from a power saving state to a wake-up state in response to detecting the electric signal, wherein the second display apparatus transitions to the wake-up state independently from system driving of the first display apparatus, wherein the first display apparatus includes a first voltage receiver configured to receive a voltage when the first display apparatus transitions to a wake-up state, and including a pull-up resistor, wherein the second display apparatus includes:

a first reception channel; and a pull down resistor which a first reception channel of the second is connected to, and wherein the variation of the second voltage is generated by the pull-up resistor and the pull-down resistor.

* * * * *